(12) United States Patent
Mujibiya et al.

(10) Patent No.: US 10,419,522 B2
(45) Date of Patent: Sep. 17, 2019

(54) SYSTEMS AND METHODS FOR SYNCHRONIZING DATA ACROSS DEVICES AND MEDIATING DATA SHARING

(71) Applicant: LENOVO (SINGAPORE) PTE. LTD., New Tech Park (SG)

(72) Inventors: Adiyan Mujibiya, New Tech Park (SG); Jun Luo, New Tech Park (SG)

(73) Assignee: Lenovo (Singapore) Ptd. Limited, New Tech Park (SG)

( * ) Notice: Subject to any disclaimer, the term of this patent is extended or adjusted under 35 U.S.C. 154(b) by 301 days.

(21) Appl. No.: 15/620,520

(22) Filed: Jun. 12, 2017

(65) Prior Publication Data
US 2018/0359307 A1   Dec. 13, 2018

(51) Int. Cl.
| | | |
|---|---|---|
| *G06F 15/16* | (2006.01) | |
| *H04L 29/08* | (2006.01) | |
| *G06F 16/27* | (2019.01) | |
| *G06F 3/0488* | (2013.01) | |
| *G06F 3/0484* | (2013.01) | |

(52) U.S. Cl.
CPC ............ *H04L 67/06* (2013.01); *G06F 16/27* (2019.01); *H04L 67/1095* (2013.01); *G06F 3/04842* (2013.01); *G06F 3/04883* (2013.01)

(58) Field of Classification Search
CPC ..... H04L 67/06; H04L 67/1095; G06F 16/27; G06F 3/04842; G06F 3/04883
See application file for complete search history.

(56) References Cited

U.S. PATENT DOCUMENTS

| | | | |
|---|---|---|---|
| 7,532,196 B2 | 5/2009 | Hinckley | |
| 7,636,794 B2 | 12/2009 | Ramos et al. | |
| 9,467,850 B2 | 10/2016 | Deisher | |
| 9,930,506 B2* | 3/2018 | Cronholm | H04W 76/14 |
| 10,073,722 B2* | 9/2018 | Messerly | G06F 9/543 |
| 2012/0159334 A1* | 6/2012 | Messerly | G06F 9/543 715/733 |
| 2014/0149949 A1* | 5/2014 | Feller | G06F 3/04886 715/863 |
| 2015/0194145 A1* | 7/2015 | Chen | G06F 3/038 345/156 |

(Continued)

*Primary Examiner* — Moustafa M Meky
(74) *Attorney, Agent, or Firm* — Nutter McClennen & Fish LLP

(57) ABSTRACT

Systems and methods for synchronizing data across devices and mediating data sharing are described. In some embodiments, the systems can include a user device and at least one target device connected over a network for sharing event information. The user device and the target devices can include sensors thereon for detecting a gesture than can correspond to events that generate commands to perform tasks. Event information collected from the sensors can be compared and normalized using a cloud infrastructure to determine if the event is synchronized between the user device and the target devices such that the user device collected the same values as the target devices. If the event is synchronized, the system can perform the task. In some embodiments, the task can include synchronizing data between the user device and the target device while selectively choosing a target device for data sharing. In some embodiments, the task can include the user device acting as a mediator for data sharing between two or more target devices.

22 Claims, 8 Drawing Sheets

(56) References Cited

U.S. PATENT DOCUMENTS

| | | | |
|---|---|---|---|
| 2016/0034132 A1* | 2/2016 | Huang | G06F 3/017 |
| | | | 345/173 |
| 2016/0373504 A1* | 12/2016 | Moncomble | H04L 65/601 |
| 2017/0245128 A1* | 8/2017 | Cronholm | H04W 76/14 |
| 2017/0264715 A1* | 9/2017 | Sharma | G06F 17/2785 |
| 2017/0318122 A1* | 11/2017 | Jiang | H04L 29/08 |
| 2017/0318260 A1* | 11/2017 | Torres | H04N 7/15 |
| 2018/0307682 A1* | 10/2018 | Sharma | G06N 3/006 |
| 2019/0087246 A1* | 3/2019 | Messerly | G06F 9/543 |

\* cited by examiner

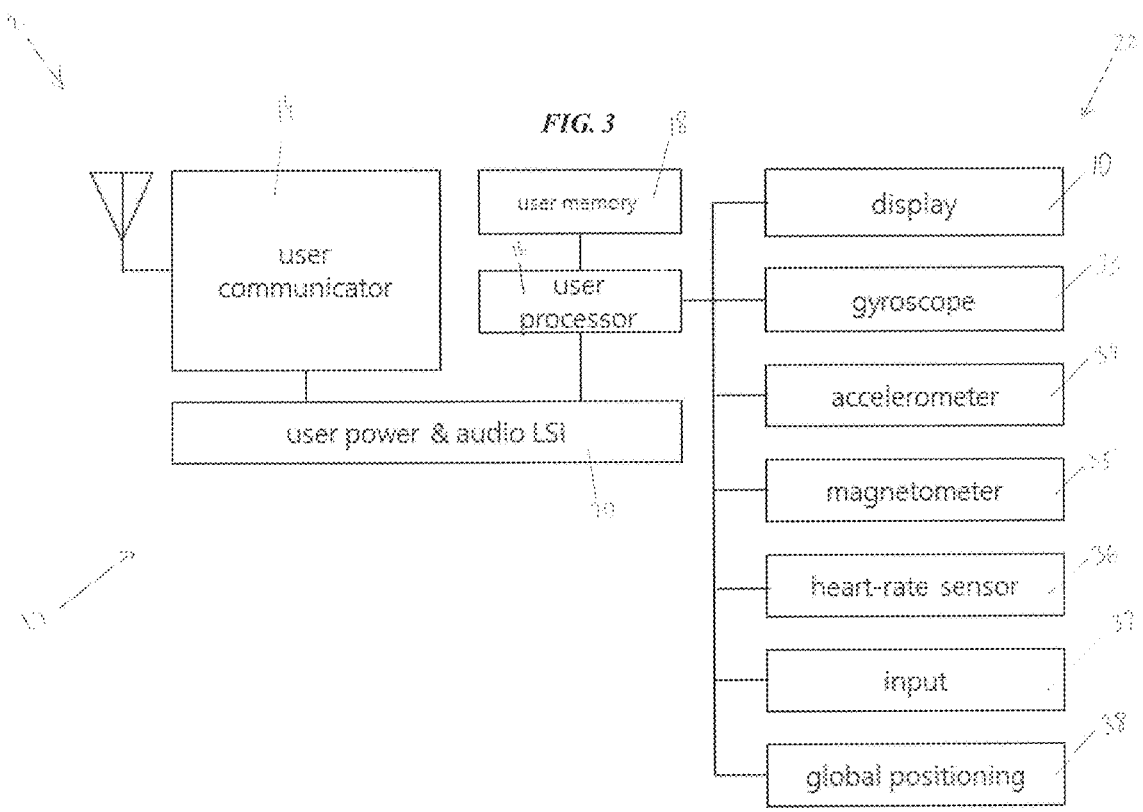

SYSTEMS AND METHODS FOR SYNCHRONIZING DATA ACROSS DEVICES AND MEDIATING DATA SHARING

FIELD OF INVENTION

The present disclosure generally relates to systems and methods for synchronizing data across devices and mediating data sharing therebetween.

BACKGROUND

With the shift in recent years towards data being sent and received electronically, the last several decades have experienced a dramatic increase in the availability of devices to handle this data. For example, user devices, e.g., personal computers, laptop computers, tablets, smart phones, etc., have become widely available for occupational as well as at-home use. As a result of the abundance of data, as well as concerns over data security, it is common for individuals to own separate devices for personal and work-related matters, sometimes owning more than one of each device.

Occasionally, however, data cannot immediately be stored in the originally intended device. In some cases, the target device is unavailable, under maintenance, or being used by another party. In other cases, the data can be too large to store in the target device, or the target device may not run the proper programs that work with the data. In the case of sensitive or private data, the target device may not have sufficient security settings to store personal data thereon. In such cases, the data may be stored to a backup device, a hard drive, or, as often happens, to multiple devices to prevent against data corruption or mistaken deletion, only to be transferred at a later time. While awaiting transfer, a version of the data can be accessed or modified without updating the backup location, which may result in different versions of the same file stored on multiple devices that need to be redistributed throughout the multiple devices.

Although advances have been made in content collaboration and data sharing, existing systems and methods for promulgating data have numerous shortcomings. Establishing data synchronization between multiple devices increases the potential for security risks and data theft. Further, synchronizing data across a large number of devices can exhaust storage space, which may already be limited in some thin-client devices. For example, synchronizing data between a smartphone with a laptop can quickly exhaust the smartphone's storage space, thus ending the data synchronization prematurely. Lastly, current solutions for sharing data between devices can be complex and lack ease of use. Sharing a file from one device to another, e.g., AirDrop, etc., can require multiple steps such as signing on to the same network on both devices, selecting the file, selecting a receiver device, approving a connection to the source device on the receiver device, and accepting the file sharing. This process must also be repeated for each additional device with which the file is shared.

Accordingly, there is a continual need for systems and methods that can improve the ease of data synchronization/connection between devices and seamlessly mediate data sharing therebetween.

SUMMARY OF THE INVENTION

In some embodiments, a method includes detecting an occurrence of a first event using a user device, the user device being configured to collect a first event information, the first event information having a first value; detecting an occurrence of a second event on a target device, the target device being configured to collect a second event information, the second event information having a second value; comparing the first value to the second value; generating a command to perform a task if the first value is substantially similar to the second value, the task comprising synchronizing data between the user device and the target device such that a data from the user device is shared with the target device or a data from the target device is shared with the user device; and performing the task. The first value can include a first timestamp and the second value can include a second timestamp, the first and second timestamps occurring within a time window such that the first value and the second value are temporally matched.

The first event and the second event can be detected by a sensor, the sensor sensing a gesture performed relative to the target device by the user device. The gesture can be performed on a touchscreen of the target device. The sensor can include at least one of a motion sensor, an optical-visual sensor, or a touch sensor. The gesture can specify the target device for performing data synchronization between the user device and the target device. The data can include at least one of a document, a file, or a graphic.

The first value can include at least one of an event type, and a location of the event relative to the target device; and the second value can include at least one of an event type, a timestamp, and a location of the event relative to the target device. The user device can include a smart device. Analyzing the first and second event information can be performed by a cloud infrastructure. The user device can include a user memory that stores the task that corresponds to the command; and the target device can include a target memory that stores the task that corresponds to the command.

In some embodiments, a method includes detecting occurrence of a first event using a user device, the user device being configured to collect a first event information, the first event information having a first value; detecting occurrence of a second event on a first target device, the first target device being configured to collect a second event information, the second event information having a second value; detecting occurrence of a third event on a second target device, the second target device being configured to collect a third event information, the third event information having a third value; determining whether the first value is substantially similar to at least one of the second value and the third value; generating a command to perform a task if the first value is substantially similar to at least one of the second value and the third value, the task comprising sharing data from the first target device to the second target device; and performing the task. The first value can include a first timestamp, the second value can include a second timestamp, and the third value can include a third timestamp, the first timestamp and at least one of the second timestamp and the third timestamp occurring within a time window such that the first value and at least one of the second value and the third value are temporally matched.

The first, second, and third events are detected by a sensor, the sensor sensing a first gesture performed relative to the at least one of the first target device and the second target device by the user device. Sharing data can include copying a data from the first target device and saving the data to the second target device. The data can be stored on the user device after copying. The data can include at least one of a document, a file, or a graphic. The first event and the second event can be detected by a sensor, the sensor sensing a gesture performed relative to the target device by the user device. The gesture can specify the target device for synchronizing data between the user device and the target device. The sensor can include at least one of a motion sensor, an optical-visual sensor, or a touch sensor.

The first value can include at least one of an event type, and a location of the event relative to the target device; the second value can include at least of an event type, and a location of the event relative to the target device; and the third value can include at least of an event type, and a location of the event relative to the target device. The user device can include a smart device. The method can include performing a second gesture relative to the at least one of the first target device and the second target device by the user device. The first gesture can be the same as the second gesture.

BRIEF DESCRIPTION OF THE DRAWINGS

The invention will be more fully understood from the following detailed description taken in conjunction with the accompanying drawings, in which:

FIG. 3 is a block diagram of the architecture of the user device of FIG. 2A.

DETAILED DESCRIPTION

Certain exemplary embodiments will now be described to provide an overall understanding of the principles of the structure, function, manufacture, and use of the devices and methods disclosed herein. One or more examples of these embodiments are illustrated in the accompanying drawings. Those of ordinary skill in the art will understand that the devices and methods specifically described herein and illustrated in the accompanying drawings are non-limiting exemplary embodiments and that the scope of the present invention is defined solely by the claims. The features illustrated or described in connection with one exemplary embodiment may be combined with the features of other embodiments. Such modifications and variations are intended to be included within the scope of the present invention.

In the present disclosure, like-named components of the embodiments generally have similar features, and thus within a particular embodiment, each feature of each like-named component is not necessarily fully elaborated upon. Sizes and shapes of devices and components of electronic devices discussed herein can depend at least on the electronic devices in which the devices and components will be used and the invention described herein is not limited to any specific size or dimensions.

A person skilled in the art will recognize a variety of different computer-based technologies that can be used to carry out disclosures contained herein. For example, the devices, systems and methods disclosed herein can be implemented using one or more computer systems, such as the exemplary embodiment of a computer system 100 shown in FIG. 1.

Figure 1:
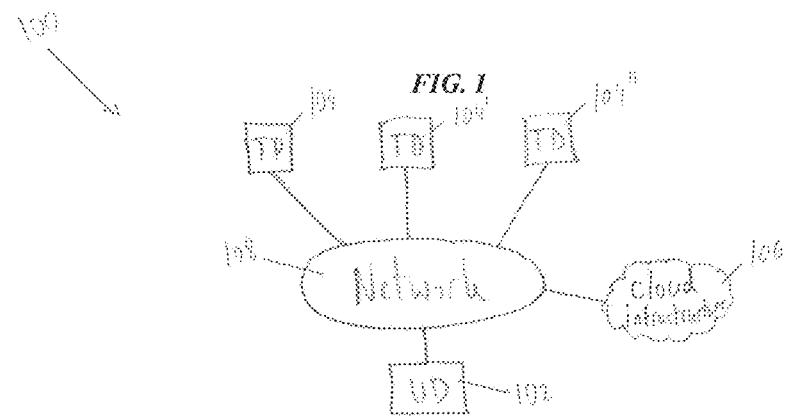
FIG. 1 is a block diagram of an embodiment of a system that can be used to synchronize data and/or share data in the embodiments described herein.

FIG. 1 is a block diagram of an example system 100 that can include one or more modules configured to synchronize data and/or mediate data sharing therebetween. The system modules can include a user device 102, one or more target devices 104, and a cloud infrastructure 106. The system modules can communicate with one another over a network 108. In use, the user device 102 can select a target device 104, 104', 104" for data synchronization and/or data sharing, or the user device 102 can act as a mediator to share data between target devices. It will be appreciated that a single user device 102 can first be used to select a target device 104 for data synchronization and/or data sharing and then act as a mediator for data sharing between multiple target devices.

Figure 2A:
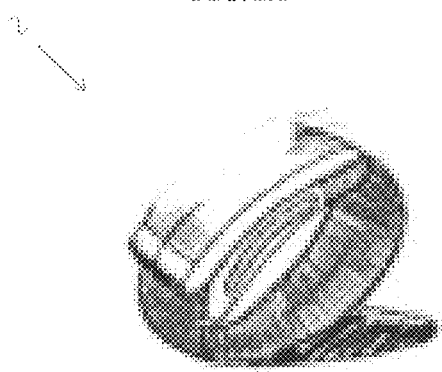
FIG. 2A is a perspective view of an example user device of the system of FIG. 1.
Figure 2B:
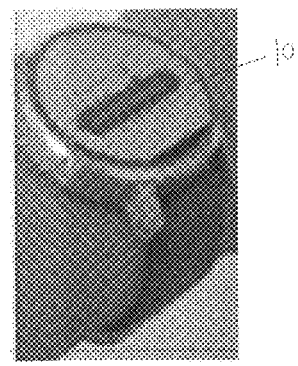
FIG. 2B is a schematic view of another example user device of the system of FIG. 1.
Figure 2C:
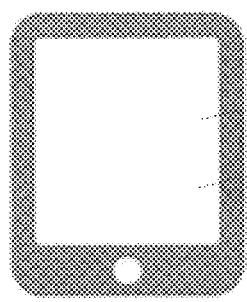
FIG. 2C is a schematic view of an example target device of the system of FIG. 1.
Figure 2D:
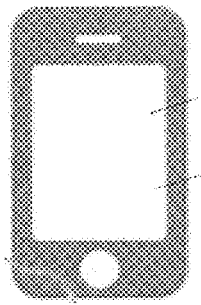
FIG. 2D is a schematic view of another example target device of the system of FIG. 1.
Figure 2E:
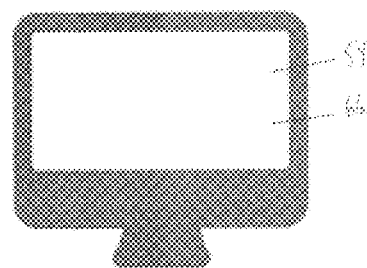
FIG. 2E is a schematic view of yet another example target device of the system of FIG. 1.

Authorized users can trigger various functions based on event type. It will be appreciated that the functions described below represent some non-limiting examples of functions of the system 100 and many additional functions are possible. In an exemplary embodiment, users having a wearable user device, as shown in FIG. 2A, can interact with touchscreen target devices, as shown in FIGS. 2B-2D, using different gestures. The system 100 can provide different content for each user device based on the access privileges granted to the user device. Access privileges can be defined by the settings of the user device 102, the target device 104, the cloud infrastructure 106, another system module, and/or a combination of these modules.

In selecting a target device 104, 104', 104" for data sharing, the user device 102 can be configured to communicate with the one or more target devices to synchronize data with the target devices. The user device 102 can perform the gesture relative to the target device 104, 104', 104" to initiate data synchronization between the user device and the target device. Selection of the target device 104, 104', 104" and initiation of data synchronization can be performed with a single gesture, though, in some embodiments, a separate gesture may be required to initiate data synchronization. In some embodiments, the user device 102 and the target device 104, 104', 104" can include device sensors 22 and target sensors 52, 52", respectively, that can sense the gesture and determine whether the gesture corresponds to an event that can generate a command to perform a task, e.g. synchronize data between the target device and the user device. The user device 102 and the target device 104, 104', 104" can collect event information that logs details of the event and send the event information to the cloud infrastructure. The cloud infrastructure 106 can compute whether the event information from the user device 102 is synchronized with, or matches, the event information from the target device 104, 104', 104".

If the event information of the user device 102 matches the event information the target device 104, the cloud infrastructure 106 can identify the source device and the receiver device, and initiate data synchronization therebetween. During data synchronization, data can move from the user device 102 to the target device 104, 104', 104", from the target device 104, 104', 104" to the user device 102, from the cloud infrastructure 106 to the target device 104, 104', 104", and/or from the target device 104, 104', 104" to the cloud infrastructure 106. It will be appreciated that although the user device 102 data can be synchronized with each target device 104, 104', 104", data synchronization can be established between the user device and a selected device on a network of other devices. This feature strengthens the security and privacy of the information as the number of devices having access to the information is limited.

In some embodiments, as mentioned above, the user device 102 can serve as a mediator to share data from a first target device 104 to a second target device 104". The user device 102 can perform a first gesture relative to the first target device 104 to initiate data sharing. The gesture can select a single file, document, or graphic to be shared, though, in some embodiments, the entire contents of the target device can be shared. The user device 102 and the first target device 104 can sense the first gesture and determine whether the gesture corresponds to an event that can generate a command to perform a task, e.g., "copy" a file from the target device. The user device 102 and the first target device 104 can collect event information that logs details of the event and send the event information to the cloud infrastructure 106.

The user device 102 can perform a second gesture relative to a target device 104" to save, or "paste," the file. It will be appreciated that a copied file can be pasted to the same target device from which it originated, a different target device, or the cloud infrastructure. The user device 102 and the target device 104" can sense the second gesture and determine whether the gesture corresponds to an event that can generate a command to perform a task, e.g., save a file. The file can be pasted in a single location, though, in some embodiments, the file can be pasted in multiple locations. In some embodiments, the file can continue to be saved to specific locations until another "copy" event is triggered on a second file. After a second "copy" event is triggered, the first file can be deleted from the user device 2, and the second file can be saved to specified locations. The user device 102 and the target device 104" can collect information that logs details of the event and send the event information to the cloud infrastructure 106.

The cloud infrastructure 106 can compute whether the event information from the user device 102 matches the event information from at least one of the first target device 104 or the second target device 104". As discussed further below, the cloud infrastructure 106 can perform this computation by determining whether the event information from the user device 102 matches the event information from at least one of the target devices. Some non-limiting examples of event information can include event type, location, and timestamp, among others.

The cloud infrastructure 106 can perform computations after both the "copy" and "paste" events have been triggered, as discussed above, or, as in some embodiments, the cloud infrastructure 106 can compute whether the event information from the user device 102 matches the event information from the first target device 104 prior to the "paste" event being triggered on the second target device 104". In such embodiments, if the events are synchronized, after a "paste" event is triggered on the second target device 104", the cloud infrastructure 106 can compute whether the event information from the user device 102 and the first target device 104 matches the event information from the second target device 104".

If the events are synchronized between the user device 102 and the first target device 104, or the user device 102 and the second target device 104", the cloud infrastructure 106 can identify the source device and the receiver device, copy the file from the source device and save the file to the receiver device to complete the data sharing. It will be appreciated that after the file is copied, the file can be stored on the user device 102 while the system 100 waits for a command that specifies a location to which the file is to be saved. In some embodiments, the copied file can be stored in the cloud infrastructure 106 while the system 100 waits for a command that specifies a location to which the file is to be saved.

Although the processes described above, and further below, discuss that event information is sent to the cloud infrastructure for computation, it will be appreciated that, in some embodiments, a cloud infrastructure can be omitted from the system. In such embodiments, the user device can be configured to perform computations of event information that is logged by the user device and the target devices.

Although an exemplary computer system is depicted and described herein, it will be appreciated that this is for sake of generality and convenience. In other embodiments, the system may differ in architecture and operation from that shown and described here. The elements illustrated in FIG. 1 can be some or all of the elements of a single physical machine. In addition, not all of the illustrated elements need to be located on or in the same physical or logical machine.

FIGS. 2A and 2B illustrate exemplary embodiments of a user device 2. As shown in FIGS. 2A-2B, the user device 2 can be a smart device such as a wearable, e.g., a watch, ring, band, and so forth, though, in some embodiments, or handheld, e.g., a smartphone, timer, and the like. The user device 2 can include an input, e.g., a touchscreen or program, that can be pressed, clicked, swiped, or held down by an object to initiate interaction with the target device. The input is discussed in greater detail below. The user device 2 can detect gestures that are executed using predefined patterns, such as motion, touch, and/or signals to initiate interaction with target devices, a cloud infrastructure 6, and/or other user devices. Gestures can be detected by device sensors 22, as discussed further below. Gestures can be performed by body movements such as tapping or swiping motions using a finger, wrist, arm, foot, leg, or another body part in the case of a wearable device, or by swiping, tapping, and/or pressing-and-holding a point on a screen of the user device in the case of a handheld device. In some embodiments, an accessory, e.g., a mouse, keyboard, and so forth can be used to activate a program on the user device 2 that can correspond to a gesture. In some embodiments, as shown in FIG. 2B, the user device 2 can include a display 10 that is configured to present information thereon. The display 10 can include a digital display, and/or any type of display known to one having ordinary skill in the art.

FIGS. 2B-2D illustrate exemplary embodiments of a target device. The target device 4 can be handheld, e.g., a telephone, smartphone, tablet, and so forth, or any digital media for conveying information, a laptop, desktop computer, shareboard, monitor, and the like. The target device 4 can interact with the user device 2, the cloud infrastructure 6, and/or other target devices using motion, touch, and/or signal gestures. As shown, the target device 4 can include an input 59 described further below, e.g., a screen or program, that can be pressed, clicked, swiped, or held down by a user with the user device, to initiate interaction with the user device. In some embodiments, the input 59 can include a touch interface such as a touchscreen. In some embodiments, an accessory, e.g., a mouse, keyboard, and so forth can be used to activate a program on the target device that can correspond to a gesture being performed thereon.

In the illustrated embodiments, the input 59 can distinguish between touch gestures performed thereon. The gestures can include movements of the user on a surface of the interface that can be analyzed by either, or both, of the user device 2 and the target device 4 to determine whether the gesture corresponds to an event that can generate a command to perform a task, as described further below. Some non-limiting examples of gestures can include a "single tap," a "double tap," a "triple tap," a "tap-and hold," a "swipe left," a "swipe right," among others. Each gesture can correspond to an event that can generate a command to perform a task on the target devices. Some non-limiting examples of tasks can include synchronizing data between the user device and the target device, copying a file, pasting a file, deleting a file, saving a file, cutting a file, among others.

Each gesture can correspond to an event that can generate a command to perform the same task on each target device, though it will be appreciated that in some embodiments, a gesture performed on the first target device can correspond to an event that can generate a command to perform to a different task on the second target device. For example, a "double tap" gesture on the smartphone of FIG. 2C can correspond to a task that copies a file, while a "double tap" gesture on the monitor of FIG. 2D can correspond to a task that synchronizes data between the user device with the target device. The command can be configured to identify the user device and/or the target device that sensed the gesture, define access privileges of the user device, and/or contain content for performing the task, e.g., copy a file to the target device. Tasks can be performed based on the content of the command, as described further below.

In some embodiments, the user device can perform a gesture with respect to the target device 4 to trigger a "delete" event. The "delete" event can generate a command to delete a document, file, and/or graphic from one of the user device 2, target device 4, and/or cloud infrastructure 6. After the event is synchronized between the user device 2 and the target device 4, the file can be deleted from the user device 2, target device 4, and/or cloud infrastructure 6. It will be appreciated that each of the user device 2, target device 4, and/or cloud infrastructure 6 can include an archive (not shown) that can be configured to store deleted files.

In some embodiments, a single gesture can correspond to multiple events and initiate performance of multiple tasks simultaneously. For example, after a file is copied using a gesture, e.g., the "triple tap" gesture, system settings may change such that a "triple tap" gesture can correspond to an event that can generate a command to paste a file in a designated target device. In such an embodiment, performing a "triple tap" gesture on the file on the target device can select the content to be copied as well as indicate the source device. Selecting the content and indicating the source device using a single gesture can be intuitive from a user's perspective and increases efficiency of use of the system. A subsequent "triple tap" gesture on the same, or a different, target device can select the target device and initiate an event that can generate a command to paste the file. After the file is pasted in the target device, the system can revert to its previous settings. In some embodiments, performing the gesture on the target device, e.g. a "triple tap," can also designate a location on the target device to which the file is to be pasted.

It will be appreciated that event information can be distinguished in real-time such that the user device 2 and the target device 4 can simultaneously determine whether an event is detected. The user device 2 and the target device 4 can be configured to synchronize data in real-time in response to an event. For example, the "double tap" gesture on the target device 4 can correspond to a data synchronization event that generates a command to perform data synchronization between the user device 2 and the target device 4. After the "double tap" gesture is performed, the user device and the target device can both detect that an event was performed and share the event information with one another. Once the event information is determined to match across the devices, data synchronization between the user device 2 and the target device 4 can be performed. To stop the ongoing data synchronization and/or data sharing, a "double tap" gesture can be performed on the target device 4. It will be appreciated that if the "double tap" gesture is performed on a surface that is not the target device, or outside of the range of the target sensors 52 of the target device 4, data will not be synchronized between the user device 2 and the target device 4 because the event was not detected on the target device 4.

Event detection can occur in real-time to collect the timestamp of an event to determine temporal event matching between system modules. Real-time event detection on multiple modules can provide a check on both the user device 2 and the target device 4 to ensure that the task was intended to be performed to prevent accidental data manipulation, thereby strengthening security and privacy of the system. Real-time event detection on multiple system modules also can provide continuous availability and a quick response time whenever a gesture to initiate data synchronization and/or data transfer is detected. If during computation of event information, event information shared by the user device 2 was not normalized due to the absence of event data from the target device 4, no command is sent to the output and no tasks can be performed.

It will be appreciated that the user device, the target device, and/or the cloud infrastructure can define the events to which each gesture can correspond, as described further below. One having ordinary skill in the art will appreciate that the gestures and events listed above are intended to be non-limiting examples of the possible gestures and events that can be defined in at least one of the user device and the target device. Other gestures and events can include a geo-fence intrusion event in which the user device 2 can detect a nearby target device 4. Detection of nearby devices can be performed using a geolocation sensor, e.g., a GPS sensor 38, 63, and/or via interdevice communication that is capable of range sensing, e.g., Bluetooth, IR, and so forth. Once a nearby target device 4 is detected, the user device 2 and/or the target device 4 can prompt a user whether data synchronization and/or data transfer is desired. If desired, a gesture to initiate data synchronization and/or data transfer is performed to trigger a data synchronization and/or data transfer event. It will be appreciated that the geo-fence intrusion event also can occur when the target device 4 detects a nearby user device 2.

Not every gesture corresponds to an event that can generate a command to perform a task. In the event that such a gesture is performed, no task is performed by the user device and/or the target device. For example, a user that performs a "swipe down" gesture with the user device may not generate a command to perform a task if neither the user device 2 nor the target device 4 is aware that "swipe down" corresponds to an event. After the gesture is performed, each of the user device and the target device can determine whether the gesture corresponds to an event. Once it is determined that the gesture does not correspond to an event, the user device and the target device can revert to awaiting for the occurrence of the next event.

FIG. 3 is a block diagram of components of an example user device 2 that can be used with the system 100 disclosed herein. The user device 2 can include user components 12 such as a user communicator 14, a user processor 16, a user memory 18, and a user power and audio LSI interface 20. The user device 2 can include one or more user sensors 22 for detecting events performed with the user device 2. In use, the user device 2 can be configured to send and receive information within the system to initiate interaction across modules and detect events that can generate commands that perform tasks.

The user communicator 14 can be configured to connect to other system modules to send data throughout the system 100. The data sent by the user communicator 14 can include event information, files, and/or signals for processing by system modules. The user communicator 14 can send data via wireless LAN, Bluetooth, cellular network, Ethernet, Wi-Fi, NFC, RFID, QR code, URL user ID input, and the like. The user communicator 14 can be configured to send and receive information simultaneously to and from one or more system modules, or in response to a signal from the modules. The user communicator 14 can also communicate between multiple systems to send and receive information therebetween. In some embodiments, the user communicator 14 can include a sending executor 24 for sending data throughout the modules of the system 100. The sending executor 24 can be configured to receive event information and send the event information to a transfer mediator 26 to be sent to other system modules. The transfer mediator 26 can send data to system modules via Bluetooth, LAN, the internet, or another form of digital communication known to one skilled in the art.

The user processor 16 can be configured to detect events and interpret event information that is sent to, and received from, other system modules. The user processor 16 can be a programmable general-purpose or special-purpose microprocessor and/or any one of a variety of proprietary or commercially available single or multi-processor systems. The user processor 16 can include a central processing unit (CPU, not shown) that includes processing circuitry configured to process user device data and execute various instructions. It will be appreciated that the user processor 16 can continuously scan the user device 2 for events to ensure prompt receipt and assignment of a temporal event signature for each event such that the timestamp can be recorded. In some embodiments, the user processor 16 can passively receive a signal from the user sensors 22 when a gesture is initiated. In some embodiments, the user processor 16 can include a command buffer 28 for receiving event information and/or commands from the target device 4 and/or cloud infrastructure 6. The command buffer 28 can initiate performance of tasks as instructed by the command. The command buffer 28 can process the command received from system modules, e.g., cloud infrastructure 6, and initiate the interaction based on the command instructions.

For example, after the user device 2 performs a gesture, e.g., a swipe, touch, tap, and so forth, the user processor 16 can analyze the gesture. In some embodiments, the user processor 16 can include an event detector 30. The event detector 30 can be configured to determine whether a gesture corresponds to an event. The event detector 30 can compare a signal received from one or more user sensors 22 with gesture definitions in the gesture repository to gather event information. It will be appreciated that event information can include event type, e.g., "single tap," "double tap," "swipe," "press-and-hold," and the like, identity of the target device, access privileges of the user device, and timestamp, among others.

If the gesture corresponds to an event in the gesture repository, the user processor 16 can send the event data to the user communicator 14. In some embodiments, the user processor 16 can include a report regulator 32 for creating reports based on the event information. The report regulator 32 can compile the event information into one or more reports containing information that can be sent to other system modules. The reports can include the event information gathered by the event detector 30 such as the event type, location, and timestamp, among others. The report regulator 32 can send the event information to other system modules via the user communicator 14. It will be appreciated that if the gesture is not defined in the gesture repository, the user processor 16 does not communicate the event information to the rest of the system and reverts to awaiting for the occurrence of the next event, as described above.

As shown, the user components 12 can be connected to the user power and audio LSI 20, such as a power supply and internal sound card that can be used in receiving (input) and forwarding (output) audio signals to and/or from the target device. The user power and audio LSI 20 can provide affirmative interaction feedback, e.g., a sound effect, alert, and/or notification, once an event is detected by the system 100.

The user device 2 can include one or more sensors thereon that can relay gestures of the user device 2 to the user processor 16. The sensors of the user device 2, as shown in FIG. 3, can include user sensors 22 that can be connected to the event detector 30 of the user processor 16 to relay sensed gestures thereto. The user sensors 22 can acquire event information that can be used by the cloud infrastructure 6 and/or other system modules to compute whether the event information from the user device 2 matches the event information from the target device 4. The user sensors 22 can interpret motions such as the rotation and/or bending of the arm and wrist, finger tapping gestures, and other changes of relative position of the user device to orient the position of the user device relative to system modules. Some non-limiting examples of the user sensors 22 can include a motion sensor, optical-visual sensor, touch sensor, and the like. It will be appreciated that the user sensors 22 can be located within the user device 2, on the surface of the user device 2, or within signal range of the user device 2 such that the user sensors 22 can detect manipulation of the user device 2.

In an exemplary embodiment, the user sensors 22 can include a gyroscope 33, accelerometer 34, and magnetometer 35 to determine the occurrence of motion events and to acquire event information. One having ordinary skill in the art will appreciate the manner in which the gyroscope 33, accelerometer 34, and magnetometer 35 function in combination in order to acquire temporal and spatial event information, though, in some embodiments, the user device 2 can include one or two of these devices. A number of other user sensors 22 that can detect motion or spatial orientation can be used in conjunction with, or instead of, the gyroscope, accelerometer, and magnetometer, e.g., IR sensors, global positioning sensors 38 and others, as appreciated by those skilled in the art.

The user device 2 can include a number of additional user sensors 22 for taking measurements. For example, the user device 2 can include a heart-rate sensor 36 to measure the wearer's vitals such as heart rate, blood pressure, and/or blood oxygen content. In some embodiments, the user device 2 can include the input 37 for performing gestures thereon. The input 37 can be a touchscreen, similar to the input 59 of the target device 4 described above, or any other interface known in the art. It will be appreciated that a user device 2 of the system can include all, some, or none of the user sensors 22 at a given time.

The user processor 16 can be connected to the user memory 18. The user memory 18 can provide temporary storage for code to be executed by the user processor 16 or for data acquired from one or more users, storage devices, and/or databases. The user memory 18 can be configured to store user-specific settings and information for performing tasks. Some non-limiting examples of user-specific settings can include user access privileges, storage space for copied or saved files, and so forth. In some embodiments, the user memory 18 can log activity data and/or wellness data. The user memory 18 can include read-only memory (ROM), flash memory, one or more varieties of random access memory (RAM) (e.g., static RAM (SRAM), dynamic RAM (DRAM), or synchronous DRAM (SDRAM)), and/or a combination of memory technologies.

In some embodiments, the user memory 18 can include a gesture repository (not shown) therein. The gesture repository can be configured to be accessed by the user processor 16 to determine whether a detected gesture corresponds to an event. The gesture repository can store gestures and events that corresponds to each gesture. It will be appreciated that the gesture repository can store up to 10 gestures, up to 25 gestures, up to 50 gestures, up to 100 gestures, up to 150 gestures, up to 200 gestures, up to 250 gestures, and so forth, as well as associated event definitions. After the correspondence is established, event information can be created and shared with other system modules to generate the command to perform a task. In some embodiments, the user memory 18 can interpret the command that is generated by system modules to determine the task that can correspond thereto.

One having ordinary skill in the art will appreciate that users can customize the gesture repository. Users can create new gestures, assign a corresponding event to new gestures, delete gestures, and/or edit the corresponding events of gestures in the gesture repository. In the case of multiple user devices in a system, each user device can be customized to include a unique set of gestures and corresponding events in its user memory. Each event can generate a command that can signal system modules to perform a unique task. For example, the user memory 18 of a first user device can set a "single tap" gesture to correspond to an event that generates a command to synchronize data between the user device and the target device 4, while a second user device can set the "single tap" gesture to correspond to an event that generates a command to delete a selected file from the target device 4.

The user memory 18 can also store user authorization information. The user device 2 can be configured such that users must be authorized in the system to be able to add, copy, paste, and generally modify digital content. User authorization can be linked to the wearable device, though it will be appreciated that user authorization can be based on a particular handheld device, an IP address, or other identifying information. The authorization information can be stored in the display memory and accessed following event detection.

The user memory 18 can store content that can record connectivity and sharing event information between modules. In some embodiments, the user memory 18 can store a history, or list, of previously connected target device(s). The list of previously connected target device(s) can be used to accelerate, or bypass, authorization of the user device 2 for devices that have previously been authorized. In some embodiments, the user memory 18 can include a cache (not shown) to improve connectivity and data sharing. The cache can store user settings from the user device 2, the target device 4, the cloud infrastructure 6, and other system modules to allow for faster connectivity between modules when the user device accesses the system. The cache can also store settings that the user device 2 uses to connect to other system modules to expedite data sharing therebetween. In some embodiments, the user memory 18 can also include an information transfer log (not shown) to track information shared between modules, monitor users' access history, confirm event synchronization across modules, and so forth.

Figure 4:
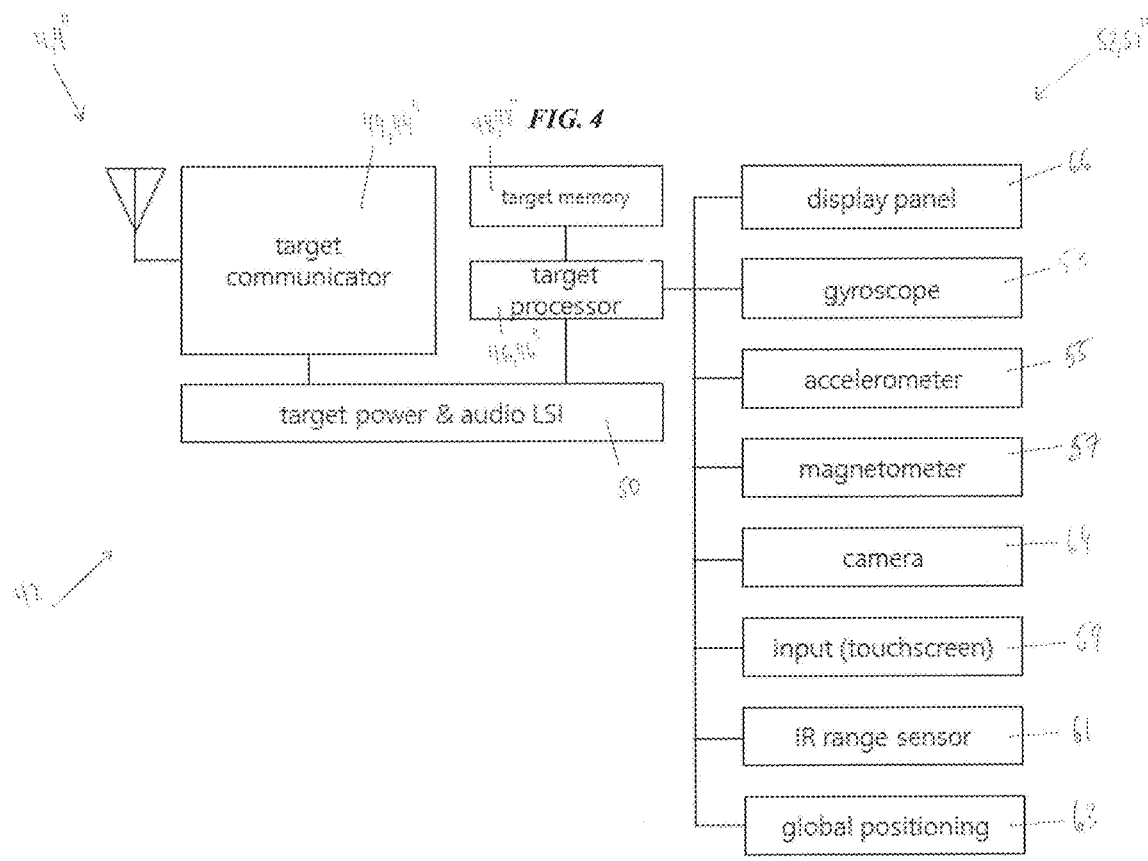
FIG. 4 is a block diagram of the architecture of a target device of FIGS. 2B-2D.

FIG. 4 is a block diagram of components of an example target device that can be used with the system 100 disclosed herein. The target device 4 can include target components 42 such as a target communicator 44, a target processor 46, a target memory 48, and a target power and audio LSI interface 50. The target device 4 can include one or more target sensors 52 for detecting events performed relative to the target device 4. In use, the target device 4 can be configured to send and receive information within the system to initiate interaction across modules and detect events that can generate commands that perform tasks. It will be appreciated that one or more of the target components 42 can function in the same way as their corresponding user components 12 in the user device 2, though one or more of the target components 42 can perform a different function.

The target communicator 44 can be configured to connect to other system modules to send data throughout the system 100. The data sent by the target communicator 44 can include event information, files, and/or signals for processing by system modules. The target communicator 44 can send signals and information via wireless LAN, Bluetooth, cellular network, Ethernet, Wi-Fi, NFC, RFID, QR code, URL user ID input, and the like. The target communicator 44 can be configured to send and receive information simultaneously to and from one or more sources, or in response to a signal from the modules. The target communicator 44 can also communicate between multiple systems to send and receive information therebetween. In some embodiments, the target communicator 44 can include a sending executor 54 for sending data throughout the modules of the system 100. The sending executor 54 can be configured to receive event information and send the event information to a transfer mediator 56 to be sent to other system modules. The transfer mediator 56 can send data to system modules via Bluetooth, LAN, the internet, or another form of digital communication known to one skilled in the art.

The target processor 46 can be configured to detect events and communicate event information that is sent to, and received from, other system modules. The target processor 46 can be a programmable general-purpose or special-purpose microprocessor and/or any one of a variety of proprietary or commercially available single or multi-processor systems. The target processor 46 can include a central processing unit (CPU, not shown) that includes processing circuitry configured to process target device data and execute various instructions. It will be appreciated that the target processor 46 can continuously scan the target device 4 for events to ensure prompt receipt and assignment of a temporal event signature for each event such that the timestamp can be recorded. In some embodiments, the target processor 46 can passively receive a signal from the target sensors 52 when a gesture is initiated. In some embodiments, the target processor 46 can include a command buffer 58 for receiving event information and/or commands from the cloud infrastructure 6. The command buffer 58 can initiate performance of tasks as instructed by the command. The command buffer 58 can process the command received from system modules, e.g., cloud infrastructure 6, and initiate the interaction based on the command instructions.

For example, after the user device 2 performs a gesture relative to the target device 4, e.g., the target device 4 detects a swipe, touch, and/or tap of the user device 2, the target processor 46 can analyze the gesture. In some embodiments, the target processor 46 can include an event detector 60 configured to determine whether a gesture corresponds to an event. The event detector 60 can compare a signal received from one or more target sensors 52 with gesture definitions in the gesture repository to gather event information. It will be appreciated that event information can include event type, e.g., "single tap," "double tap," "swipe," "press-and-hold," and the like, identity of the target device, access privileges of the user device, and timestamp, among others.

If the gesture corresponds to an event in the gesture repository, the target processor 46 can send the event information to the target communicator 44. In some embodiments, the target processor 46 can include a report regulator 62 for creating reports based on the event information. The report regulator 62 can compile the event information into one or more reports containing information that can be sent to other system modules. The reports can include the event information gathered by the event detector 60 such as the event type, location, and timestamp, among others. The report regulator 32 can send the event information to other system modules via the target communicator. It will be appreciated that if the gesture is not defined in the gesture repository, the target processor 46 does not communicate the event information to the rest of the system and reverts to awaiting for the occurrence of the next event, as described above.

The target processor 46 and target communicator 44 can be connected to the target power and audio LSI 50, such as a power supply and internal sound card that can be used in receiving (input) and forwarding (output) audio signals to and/or from the target device. The target power and audio LSI 50 can provide affirmative interaction feedback, e.g., a sound effect, alert, and/or notification, once an event is detected by the system 100.

The target device 4 can include one or more sensors thereon that can relay gestures of the user target device 4 to the target processor 46. The sensors of the target device 4, as shown in FIG. 4, can include target sensors 52 that can be connected to the event detector 60 of the target processor 46 to relay sensed gesture thereto. The target sensors 52 can acquire event information that can be used by the cloud infrastructure 6 and/or other system modules to compute whether the event information from the user device 2 is matches the event information from the target device 4. The target sensors 52 can interpret motions such as the rotation and/or bending of the arm and wrist, finger tapping gestures, and other changes of relative position relative to the target device 4. Some non-limiting examples of the target sensors 52 can include a motion sensor, optical-visual sensor, touch sensor, and the like. It will be appreciated that the target sensors 52 can be located within the target device 4, on the surface of the target device 4, or within signal range of the target device 4 such that the target sensors 52 can detect gestures made by the user device 2.

In an exemplary embodiment, the target sensors 52 can include a gyroscope 53, accelerometer 55, and magnetometer 57 to determine the occurrence of motion events and to acquire event information. One having ordinary skill in the art will appreciate the manner in which the gyroscope 53, accelerometer 55, and magnetometer 57 function in combination in order to acquire temporal and spatial event information, though, in some embodiments, the target device 4 can include one or two of these devices. A number of other target sensors 52 that can detect motion or spatial orientation can be used in conjunction with, or instead of, the gyroscope, accelerometer, and magnetometer, e.g., IR range sensors 61, GPS sensors 53, among others, as appreciated by those skilled in the art.

The target sensors 52 can include one or more optical sensors for detecting gestures. Optical sensors can be used in conjunction with, or in lieu of, motion sensors, as described above. For example, in some embodiments, the target device 4 can include a camera 64 that is configured to identify gestures. The camera 64 can be positioned on the target device 4, or in proximity with the target device, such that the camera can sense gestures. The gestures can then be analyzed by the target processor 46 to determine if an event corresponds therewith. It will be appreciated that multiple cameras can be used by the target device 4 to detect gestures. Use of multiple cameras can increase the accuracy of gesture sensing. Multiple cameras can be synchronized to produce more accurate spatial orientation measurements. Additional examples of optical sensors that can be used with the system can include video recorders, proximity detectors, fiber optic sensors, and so forth.

In some embodiments, the target sensors 52 can include a display panel 66 configured to display shared information thereon. The display panel 66 can extend throughout the entire length of the target device 4, or through a portion thereof. After computation is performed, the target device 4 can output the command to the display panel 66 for presentation. The display panel 66 can be configured to be interactive, as described further below, though it will be appreciated that in some embodiments, information on the display panel 66 can only be modified using a wearable and/or handheld device. The display panel 66 can also be fully customized by adjusting colors, sizes of icons, location of files, and so forth. Individual customizations can be set individually for each user, or default parameters can be input for the display panel by a system administrator. In some embodiments, the display panel 66 can include a selector 68 for modifying presentation content on the display panel 66. The selector 68 can include settings for changing colors, drawing shapes, deleting and/or drawing content thereon, and so forth. The display panel 66 can include a digital display, and/or any type of display known to one having ordinary skill in the art.

In some embodiments, the target sensors 52 can include the input 59 for detecting touch gestures thereon. The input 59 can be located on the display panel 66 or can be separate from the display panel 66. In an exemplary embodiment, the target device 4 can include a touchscreen that can sense gestures made thereon. The touchscreen can extend throughout the entire display panel 66 or through a portion thereof (similar to a laptop trackpad). The touchscreen can enable users to interact directly with the target device 4 by copying and pasting content directly to the display panel 66. After a gesture is performed, the touchscreen can detect a gesture type and share the information with the target processor 46 to determine whether the gesture corresponds to an event. The touchscreen can also share the timestamp and the location of the gesture relative to the target device 4 with the target processor 46. In some embodiments, the touchscreen can allow users to control a pointer that can travel along the display panel of the target device 4 to select, cut, and/or copy files, documents, and/or pictures that are displayed on the display panel 66.

The target processor 46 can be connected to the target memory 48. The target memory 48 can provide temporary storage for code to be executed by the target processor 46 or for data acquired from one or more users, storage devices, and/or databases. The target memory 48 can be configured to store user-specific settings and information for performing tasks. Some non-limiting examples of user-specific settings can include user access privileges, storage space for copied or saved files, and so forth. In some embodiments, the user memory 18 can log activity data and/or wellness data. The target memory 48 can include read-only memory (ROM), flash memory, one or more varieties of random access memory (RAM) (e.g., static RAM (SRAM), dynamic RAM (DRAM), or synchronous DRAM (SDRAM)), and/or a combination of memory technologies.

In some embodiments the target memory 48 can include a gesture repository (not shown) therein. The gesture repository can be configured to be accessed by the target processor 46 to determine whether a detected gesture corresponds to an event. The gesture repository can store gestures and events that corresponds to each gesture. The gesture repository can store up to 10 gestures, up to 25 gestures, up to 50 gestures, up to 100 gestures, up to 150 gestures, up to 200 gestures, up to 250 gestures, and so forth, as well as associated event definitions. After the correspondence is established, event information can be created and shared with other system modules to generate the command to perform a task. In some embodiments, the target memory 48 can interpret the command that is generated by system modules to determine the task that corresponds thereto.

One having ordinary skill in the art will appreciate that users can customize the gesture repository. Users can create new gestures, assign a corresponding event to new gestures, delete gestures, and/or edit the corresponding events of gestures in the gesture repository. In the case of multiple target devices in a system, each target device can be customized to include a unique set of gestures and corresponding events in its target memory. Each event can generate a command that can signal system modules to perform a unique task. For example, the target memory 48 of a first user device can set a "single tap" gesture to correspond to an event that generates a command to synchronize data between the user device and the target device 4, while a second user device can set the "single tap" gesture to correspond to an event that generates a command to delete a selected file from the target device 4.

The target memory 48 can also store user authorization information. The target device 4 can be configured such that users must be authorized in the system to be able to add, copy, paste, and generally modify digital content. User authorization can be linked to the target device, though it will be appreciated that user authorization can be based on a particular handheld device, an IP address, or other identifying information. The authorization information can be stored in the display memory and accessed following event detection.

The target memory 48 can store content that can record connectivity and event information sharing between modules. In some embodiments, the target memory 48 can store a history, or list, of previously connected user device(s). The list of previously connected user device(s) can be used to accelerate, or bypass, authorization of the user device 2 for devices that have previously been authorized. In some embodiments, the target memory 48 can include a cache (not shown) to improve connectivity and data sharing. The cache can store user settings from the user device 2, the target device 4, the cloud infrastructure 6, and other system modules to allow for faster connectivity between modules when the user device accesses the system. The cache can also store settings that the target device 4 uses to connect to other system modules to expedite data sharing therebetween. In some embodiments, the target memory 48 can also include an information transfer log (not shown) to track information shared between modules, monitor users' access history, confirm event synchronization across modules, and so forth.

In some embodiments, event information can be sent from the target device 4 and the user device 2 to a cloud infrastructure 6 over the network 8. The network 8 can enable the system 100 to communicate with remote devices (e.g., other computer systems) over a network, and can be, for example, remote desktop connection interfaces, Ethernet adapters, Bluetooth and/or other local area network (LAN) adapters known to one skilled in the art. The cloud infrastructure 6 can include one or more computational parts therein, e.g., CPU, memory part, and one or more network I/O interface(s), to function as a content server that can perform event information computations. The network I/O interface(s) can include one or more interface components to connect the system 100 with other electronic equipment. For example, the network I/O interface(s) can include high speed data ports, such as USB ports, 1394 ports, etc. Additionally, the system 100 can be accessible to a human user, and thus the network I/O interface(s) can include displays, speakers, keyboards, pointing devices, and/or various other video, audio, or alphanumeric interfaces.

In some embodiments, the system 100 can include one or more storage device(s) (not shown). The storage device(s) can include any conventional medium for storing data in a non-volatile and/or non-transient manner. The storage device(s) can thus hold data and/or instructions in a persistent state (i.e., the value is retained despite interruption of power to the system 100). The storage device(s) can include one or more hard disk drives, flash drives, USB drives, optical drives, various media cards, and/or any combination thereof and can be directly connected to any module in the system 100 or remotely connected thereto, such as over a network. The various elements of the system 100 can also be coupled to a bus system (not shown). The bus system is an abstraction that represents any one or more separate physical busses, communication lines/interfaces, and/or multi-drop or point-to-point connections, connected by appropriate bridges, adapters, and/or controllers.

Figure 5:
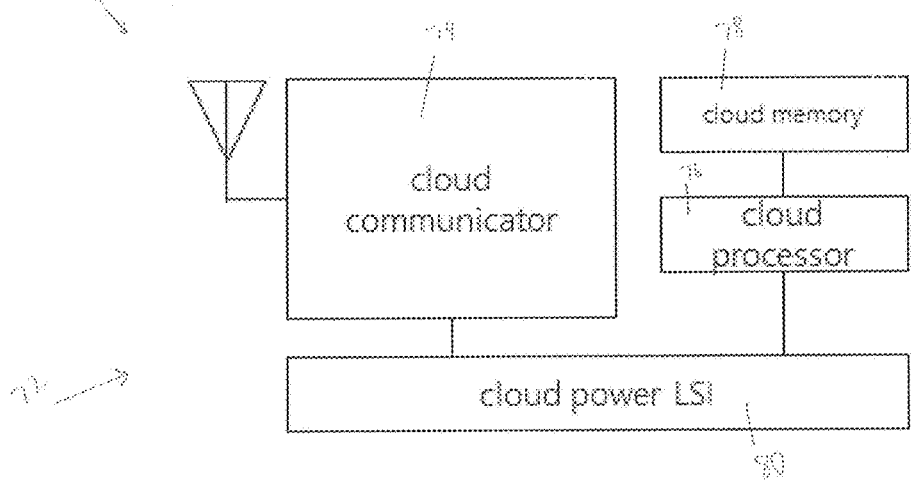
FIG. 5 is a block diagram of the architecture of a cloud infrastructure used in the system of FIG. 1.

As shown in FIG. 5, a block diagram of an example cloud infrastructure 6 that can be used with the system of FIG. 1, as discussed above. The cloud infrastructure 6 can include cloud components 72 such as a cloud communicator 74, a cloud processor 76, a cloud memory 78, and a cloud power LSI 80. In use, the cloud infrastructure 6 can be configured to perform computations on event information received from the user device and the target device. Event information can be sent from the user processor 16 and the target processor 46 to the cloud processor 76 for analysis of event synchronization.

For example, event information from the user processor 16 and the target processor 46 that is sent via the user communicator 14 and the target communicator 44, respectively, can be received by the cloud communicator 74. The cloud communicator 74 can share the event information with the cloud processor 76 to perform computations. In some embodiments, the cloud processor 76 can include a report receiver 77. The report receiver can be configured to receive reports and/or event information from the user communicator 14 and the target communicator 44 for normalization.

The cloud processor 76 can be configured to detect events and interpret event information that is sent to, and received from, other system modules. The cloud processor 76 can be a programmable general-purpose or special-purpose microprocessor and/or any one of a variety of proprietary or commercially available single or multi-processor systems. The cloud processor 76 can include a central processing unit (CPU, not shown) that includes processing circuitry configured to process user device data and execute various instructions. The cloud processor 76 can normalize event information received from the user device(s), target device(s) and other system modules by extracting event type, timestamp, and/or access privileges from the event information. The cloud processor 76 extracts multiple values from the event information to minimize the possibility that the events detected by the user processor 16 and the target processor 46 were performed unintentionally or as a result of system error. The greater the number of values that are extracted and normalized, the greater the accuracy of the system when performing the task. For example, in an event that the cloud processor 76 normalizes event information based on timestamp and event type, if the value for one of the event type or timestamp provided by the user processor 16 does not match that of the target processor 46, the task will not be performed. In this way, a task will not be performed in an event that an intended "double tap" on the target device 4 was errantly detected as a "single tap" by the user device 2, despite the "double tap" and the "single tap" having the same timestamp. In such an embodiment, the "double tap" gesture can be repeated until the event type collected by the user device 2 matches the event type collected by the target device 4, in addition to a matching timestamp, to perform the task that corresponds with the "double tap." It will be appreciated that in some embodiments, the cloud processor 76 can normalize event information based on a single value, such as timestamp, while in other embodiments, normalization can be performed based on two values, such as event type and timestamp, three values, such as event type, timestamp, location, four values, and so forth.

In some embodiments, the user processor 16 and the target processor 46 can include a time window having a predefined range during which to detect temporally matching events. The predefined range can specify a certain amount of time after the event is detected that can be used to determine whether the gesture is detected by other system modules. The predefined range of the time window can accommodate time delays and lags that can potentially occur during processing and communication between system modules. For example, the time window on each of the user processor 16 and the target processor 46 can be set such that if the cloud processor 76 determines that the timestamp of a "double tap" gesture sent from each of the user processor 16 and the target processor 46 is determined to be within the range, the event information can be deemed matched and a command to perform a task can be generated. To be temporally matched, the predefined range of the time window can be about 0.25 seconds, about 0.5 seconds, about 0.75 seconds, about 1 second, about 1.25 seconds, about 1.5 seconds, about 1.75 seconds, about 2 seconds, about 3 seconds, and so forth. In some embodiments, the time window can be adaptive. The range in an adaptive time window can vary depending on factors such as, length of time to perform gesture, type of connection between system modules, number of system modules in the system, and so forth. In some embodiments, the cloud processor 76 can include a synchronization detector 79. The synchronization detector 79 can be configured to receive reports and/or event information from the report receiver 77 to perform computations to determine if the events are distinguishable. The synchronization detector 79 can analyze the event information to determine if the values for timestamp and event type match between two or more modules, e.g., if the event information shared by the user device 2 is the same as the event information shared by the target device 4, as discussed with regard to FIGS. 6A-6B below. In some embodiments, the synchronization detector 79 can normalize event information between the user device and two or more target devices, as discussed with regard to FIGS. 9A-9C below, or between the target device and multiple user devices. In some embodiments, the synchronization detector 79 can normalize event information between multiple user devices and multiple target devices.

The cloud processor 76 can be connected to the cloud memory 78. The cloud memory 78 can provide temporary storage for code to be executed by the cloud processor 76 or for data acquired from one or more users, storage devices, and/or databases. The cloud memory 78 can be configured to store user-specific settings and information for performing tasks. Some non-limiting examples of user-specific settings can include user access privileges, storage space for copied or saved files, and so forth. The cloud memory 78 can include read-only memory (ROM), flash memory, one or more varieties of random access memory (RAM) (e.g., static RAM (SRAM), dynamic RAM (DRAM), or synchronous DRAM (SDRAM)), and/or a combination of memory technologies.

The cloud memory 78 can store content that can record connectivity and event information sharing between modules. In some embodiments, the cloud memory 78 can store a history, or list, of previously connected target device(s). The list of previously connected target device(s) can be used to accelerate, or bypass, authorization of the user device 2 for devices that have previously been authorized. In some embodiments, the cloud memory 78 can include a cache (not shown) to improve connectivity and data sharing. The cache can store user settings from the user device 2, the target device 4, the cloud infrastructure 6, and other system modules to allow for faster connectivity between modules when the user device accesses the system. The cache can also store inter-device routing information. The inter-device routing information can include optimized communication paths, e.g., P2P, cloud mediated, and/or user device mediated, for data sharing or communication between the user device 2 and the target device 4. The inter-device routing information can be accessed, for example, when the user device acts as a mediator between multiple source devices and the receiver device. In some embodiments, the cloud memory 78 can also include an information transfer log (not shown) to track information shared between modules, monitor users' access history, confirm synchronization of event information across modules, and so forth.

As shown, the cloud components 72 can be connected to the cloud power LSI 80, such as a power supply and internal sound card that can be used in receiving (input) and forwarding (output) audio signals to and/or from system modules. The cloud power LSI 80 can provide affirmative interaction feedback, e.g., a sound effect, alert, and/or notification, once an event is detected by the system 100.

In some embodiments, the system 100 can determine that an event was created by a non-authorized user. In an exemplary embodiment, lack of event synchronization between the user device 2 and the target device 4 can suggest that the event was performed by a non-authorized user. It will be appreciated that events detected from gestures by non-authorized users can be the same, or similar to, events detected from gestures by authorized users, except non-authorized users are users that are not recognized by the system 100. Non-authorized users can include users who do not have a user device, users who have a user device that is on a different network than the target device 4, and/or users who do not have proper permissions for accessing content on the target device 4. In some embodiments, lack of event synchronization between the user device 2 and the target device 4 can indicate system error. In response to a determination gesture performed by a non-authorized user, or in the event of system error, the process can terminate and the user processor and target processors can revert to awaiting for the occurrence of the next event. In some embodiments, a request to verify that the user device is authorized can be generated. In response, the user can input credentials to authorize access to system modules. Some non-limiting examples of inputs can include a password, passcode, biometrics, e.g., a fingerprint, iris scanner, eye scanner, face scanner, voice recognition, and/or any other form of identification known to one having ordinary skill in the art.

Otherwise, if the event information is synchronized between the user device 2 and at least one of the target devices, the cloud processor 76 can ensure that the source device and the target devices are identified and initiate data sharing. In some embodiments, the cloud processor 76 can include a transmitter 81 for identifying the source device and the target device to initiate data sharing. The transmitter 81 can include a unit for processing data, e.g., CPU, that can decipher tasks based on event information. The transmitter 81 can communicate with the cloud memory 78 to access data contained therein. The transmitter 81 can determine the task that corresponds to the event that can be shared with other cloud processor components, e.g., the report regulator. Other command instructions can include to load user-specific settings and/or perform tasks in accordance with the command.

In some embodiments, the transmitter 81 can include a flag parameter (not shown) that resembles a toggle, e.g., Boolean "False"/"True" or "0"/"1" or "OFF"/"ON". Data sharing can be initiated when a value of the flag parameter changes from "True" to "False," "1" to "0" or "ON" to "OFF." In the event that a synchronized event is detected, the flag parameter value can be inverted. To determine whether the source device has been identified, the cloud processor 76 can check the flag parameter.

It will be appreciated that the flag parameter can be set such that different gestures can be used to identify the source device and the target device. For example, a "double tap" gesture can be used to identify a source device and a "triple tap" gesture can be used to identify the receiver device. The user device 2 can identify a source device with a first "double tap" gesture and a second "double tap" gesture on another device would erase the previous identification and designate a new source device. In such embodiments, the source device may be changed multiple times prior to performing the task. Using different gestures to identify the source device and the receiver device in the flag parameter can allow for greater efficiency as the user can select and deselect a source device using a single gesture. In some embodiments, the flag parameter can be set such that the same gesture identifies the source device and the target device.

In some exemplary embodiments, the system 100 can allow personalized modification of content until a time-out occurs. The time-out can be configured to be assigned by using a temporal filter to limit the time the user has to interact with the system 100. For example, the user device 2 can perform a gesture that corresponds to an event. Once the user device 2 is identified, selection of the target device for data synchronization and/or data sharing, or the user device acting as a mediator for data sharing, can be enabled until the time allotted for modification runs out. For example, once a file is copied, the user has a designated amount of time to select a target device to which to paste the file. If the designated amount of time elapses, the copy operation may be canceled. It will be appreciated that the designated amount of time for time-out to occur can be set at 5 seconds or more, at 10 seconds or more, at 15 seconds or more, at 20 seconds or more, at 30 seconds or more, at 40 seconds or more, and so forth. In some embodiments, the system does not contain a time-out and modification can thus occur for an indefinite amount of time. After time-out occurs, the user can repeat the gesture or perform another gesture to perform data synchronization and/or data sharing.

It will be appreciated that, in some embodiments, the length of the time-out can vary based on whether the user device 2 performs data synchronization and/or data sharing or acts as a mediator for data sharing between multiple target devices. The length of the time-out can vary based on the number of gestures that can be used to perform a task. The greater the number of gestures that are performed to initiate task performance, the greater the length of the time-out. For example, when performing data synchronization and/or data sharing, a single gesture can be used to both identify the target device 4 and initiate data synchronization. Mediating data sharing between multiple target devices can utilize more than one gesture. For example, in some embodiments, when using a single user device to mediate data sharing between the source device and the receiver device, a first gesture can be performed to select the file, e.g., tap on the file icon on the source device, and a second gesture can be performed to select the receiver device, e.g., tap on the second target device. In such an embodiment, the length of the time-out for mediating data sharing can be larger than the length of the time-out when performing data synchronization and/or data sharing.

The length of the time-out when mediating data sharing can be greater by about 1.25 times, about 1.5 times, about 1.75 times, about 2 times, about 2.5 times, about 3 times, and so forth, than the length of the time-out when performing data synchronization and/or data sharing. It will be appreciated that tasks that can be performed using three or more gestures can include a greater length of time-out that those for mediating data sharing. In other embodiments, the length of the time-out when mediating data sharing can be equal to, or less than, the length of the time-out when performing data synchronization and/or data sharing.

User device and target device content can include metadata (not shown) associated therewith. Content modifications that are performed by users can add metadata that is specific to each user to the content so as to associate the modifications with a specific user. For example, following content modifications such as copying, pasting, deleting, and/or uploading of files, a metadata tag can be added to the file to record the event and/or the source of the event. Metadata tags can also be added to the target device and/or the user device to record the modification. Users can access the history of the file, the user device 2, or the target device 4 to review previous file versions or catalog previous events. This can allow previous versions of content to be accessed and to create a file history that can track the sources of content modifications, which can be a great source in the collection of user marketing data. In some embodiments, content modifications can be saved as a new version such that a history of complete documents can be created. In such embodiments, the edits performed by the user device 2 can be undone to return the file to a previous, unedited version.

FIGS. 6A-9C illustrate pictorial representations and related simplified flow diagrams of processes that may be used by embodiments of the system 100 described herein. The system 100 can use temporal-spatial event detection to initiate interaction between the one or more target devices 4 and the user device 2 to perform tasks. The tasks, as discussed above, can include selecting the target device for data synchronization and/or data sharing, or the user device acting as a mediator for data sharing.

The exemplary processes described below will be discussed with regards to a "double tap" gesture at a time ti on a touchscreen of the target device 4. In the illustrated embodiment of FIG. 6A, one having ordinary skill in the art can appreciate that the "double tap" gesture can trigger an event that can generate a command to synchronize data between the user device and the target device while also selecting the target device as a receiver device. As shown, the selected target device 4 can synchronize data with the user device 2, while unselected devices 4', 4" cannot synchronize data with the user device 2. It will be appreciated that, in some embodiments, the "double tap" gesture can trigger an event that can generate a different command, e.g., copy, paste, and/or delete a file, and so forth.

Figure 6A:
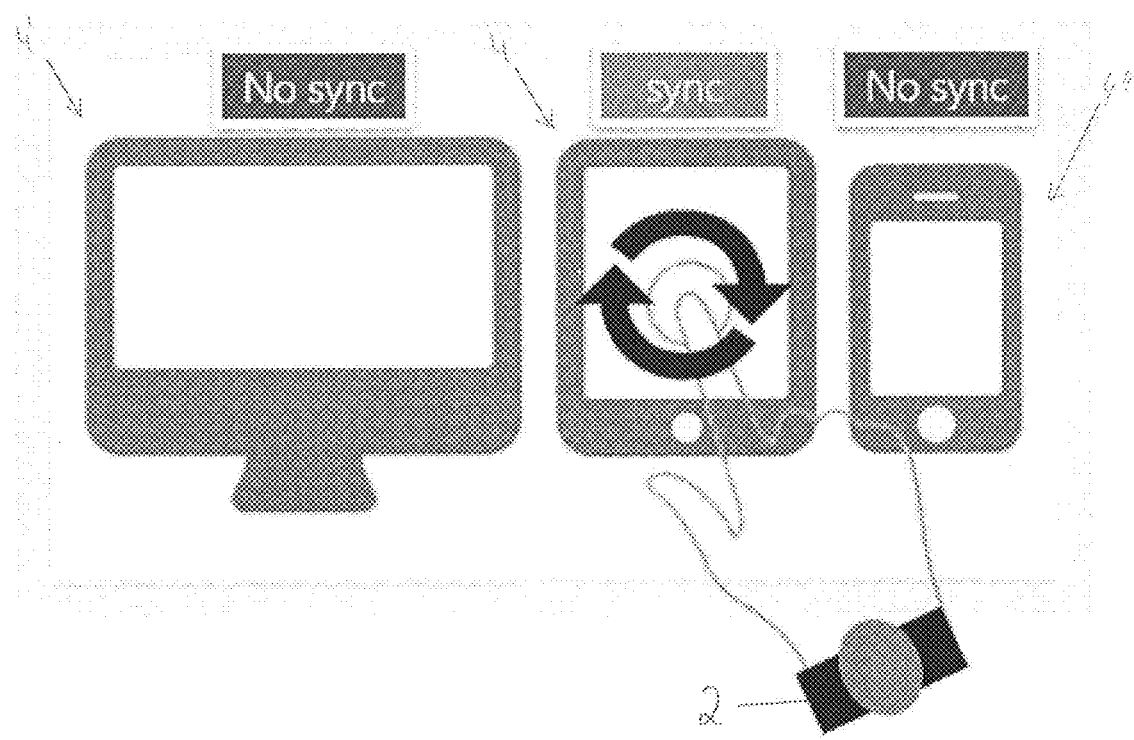
FIG. 6A is a pictorial representation of an embodiment of the system in which a target device is selected for data synchronization and/or data sharing.
Figure 6B:
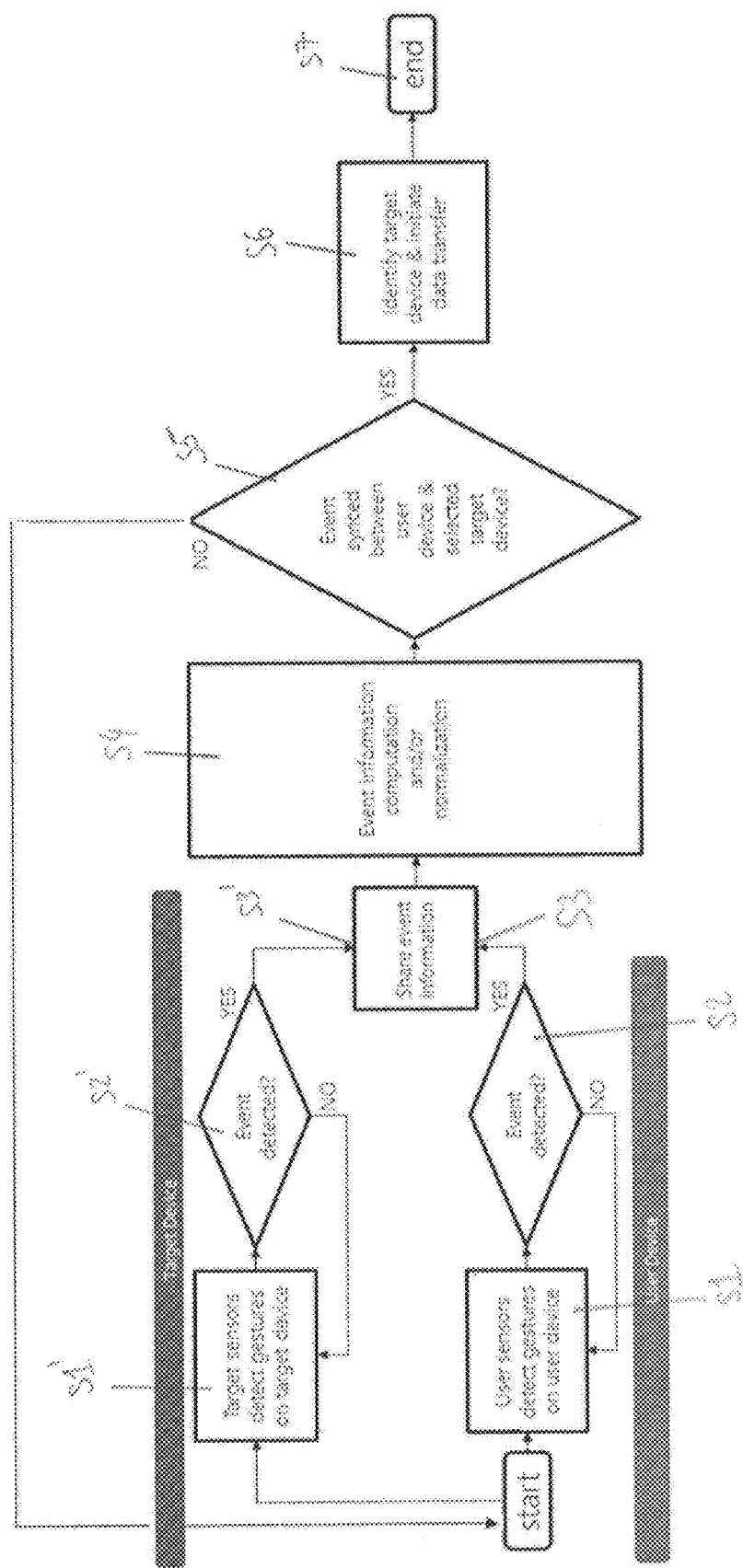
FIG. 6B is a simplified flow diagram of the procedures that may be used by embodiments described herein for the user device selecting the target device for data synchronization and/or data sharing.
Figure 7:
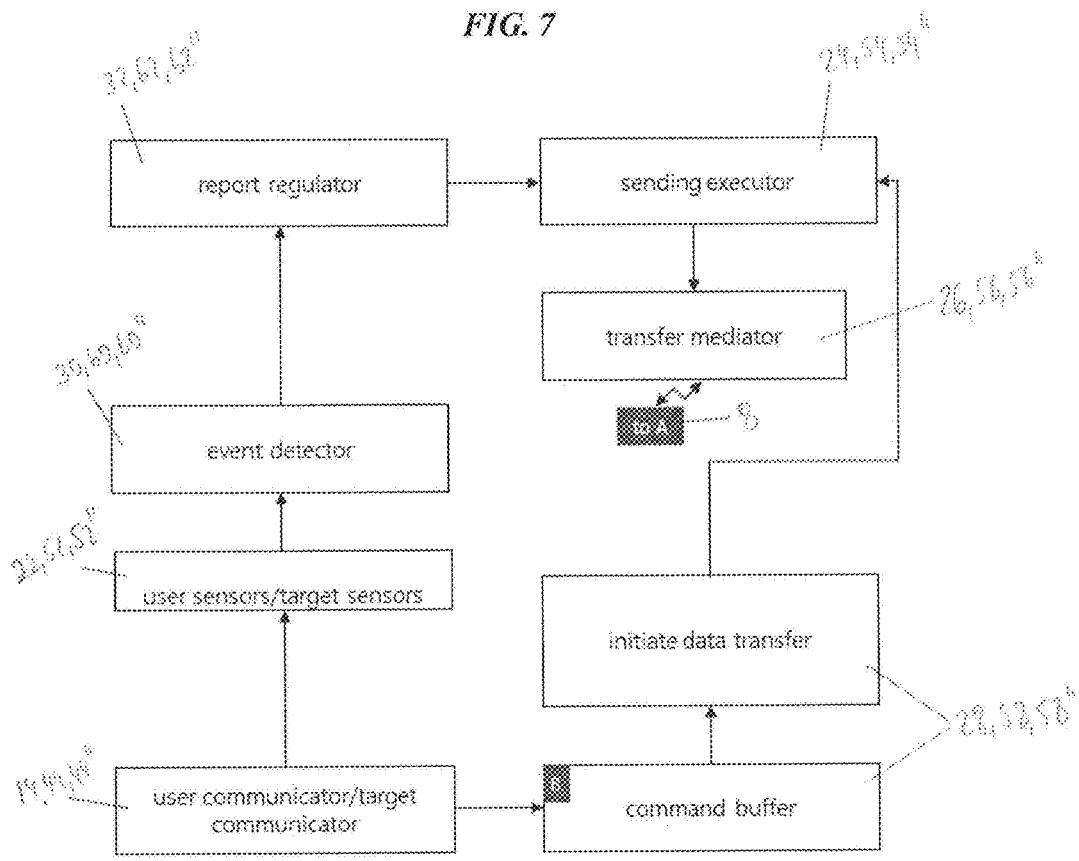
FIG. 7 is a simplified flow diagram of the procedures used by the software modules and hardware components of the user device and target device for data synchronization or mediating data sharing.

The simplified flow diagram of the embodiment of FIG. 6A is illustrated in FIG. 6B. As shown, in step S1, at least one of the user sensors 22 can sense the "double tap" gesture of the user device 2 on the target device 4. After the gesture is sensed, the process flow can proceed to step S2 where the user processor 16 can analyze the gesture to determine if it detects that the gesture corresponds to an event. The user processor 16 can include a direct connection to each respective sensor, or the user processor 16 can detect a signal transmitted from the user sensors 22 via the user communicator 14. In some embodiments, as shown in FIG. 7, the event detector 30 can analyze gestures received by the user processor 16. The event detector 30 can be configured to analyze the gesture to detect events. To analyze the gesture, the event detector 30 can access the user memory 18 to determine if the gesture is associated with an event. In some embodiments, the event detector 30 can read the gesture repository to find the event that is most closely associated with the gesture. Event information such as the event type, location of gesture performance on the target device, and/or timestamp of the event can be recorded. In some embodiments, the event detector 30 can use the event information to create a metadata file to track the source of the event information that corresponds to the event. After the event information is collected, the event information can be sent to the report regulator 32 to generate a report that records the event information. After the report is generated, the report regulator 32 can send the report and/or the event information to the user communicator 14. The event information can be sent by the sending executor 24 to the transfer mediator 26 for sending to other system modules.

If there is no event detected, the user processor 16 does not share event data with system modules and the process flow returns to step S1 where the user sensors 22 can revert to awaiting occurrence of the next event. If the user processor 16 detects that the gesture corresponds to an event, the process flow can proceed to step S3. In step S3, event information can be sent to the user communicator 14 to be shared with other system modules. In the illustrated embodiment, the user communicator 14 can send the event information to the cloud communicator 74 for computation by the cloud infrastructure 6.

In step S1', at least one of the target sensors 52 can sense the "double tap" gesture of the user device 2 on the target device 4. After the gesture is sensed, the process flow can proceed to step S2' where the target processor 46 can analyze the gesture to determine if it detects that the gesture corresponds to an event. The target processor 46 can include a direct connection to each respective sensor, or the target processor 46 can detect a signal transmitted from the target sensors 52 via the target communicator 14. In some embodiments, as shown in FIG. 7, the event detector 60 can analyze gestures received by the target processor 46. The event detector 60 can be configured to analyze the gesture to detect events. To analyze the gesture, the event detector 60 can access the user memory 48 to determine if the gesture is associated with an event. In some embodiments, the event detector 60 can read the gesture repository to find the event that is most closely associated with the gesture. Event information such as the event type, location on the target device, and/or timestamp of the event can be recorded. In some embodiments, the event detector 60 can use the event information to create a metadata file to track the source of the event information that corresponds to the event. After the event information is collected, the event information can be sent to the report regulator 62 to generate a report that records the event information. After the report is generated, the report regulator 62 can send the report and/or the event information to the target communicator 44. The event information can be sent by the sending executor 54 to the transfer mediator 56 for sending to other system modules.

If there is no event detected, the target processor 46 does not share event data with system modules and the process flow returns to step S1' where target sensors 52 can revert to awaiting occurrence of the next event. If the target processor 46 detects that the gesture corresponds to an event, the process flow can proceed to step S3'. In step S3', event information can be sent to the user communicator 14 to be shared with other system modules. In the illustrated embodiment, the user communicator 14 can send the event information to the cloud communicator 74 for computation by the cloud infrastructure.

Figure 8:
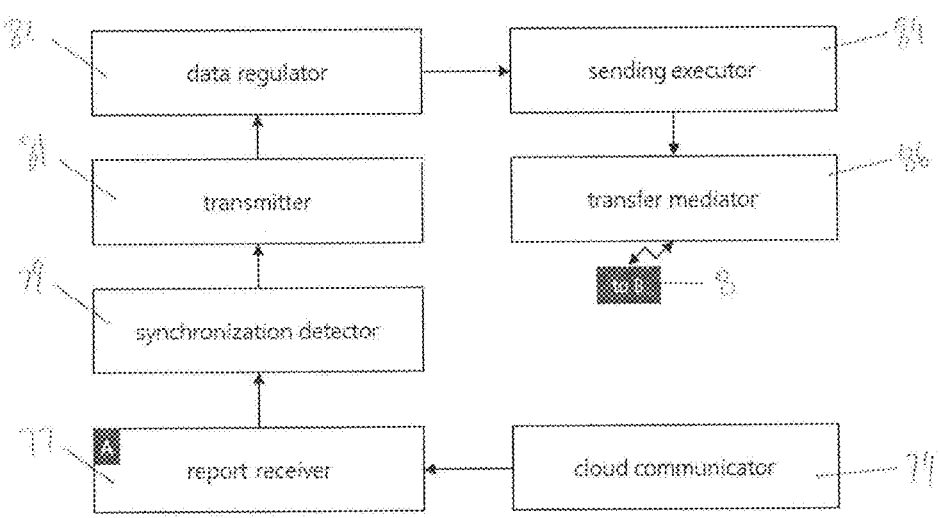
FIG. 8 is a simplified flow diagram of the procedures used by the software modules and hardware components of the cloud infrastructure for data synchronization or mediating data sharing.

The cloud infrastructure 6 can determine the existence of event synchronization between the user device 2 and the target device 4. Event information sent by the transfer mediators 26, 56 can be received by the cloud infrastructure 6 in step S4 for comparison and normalization. As shown in FIG. 8, the report receiver 77 can receive event information sent by the transfer mediators 26, 56 using the cloud communicator 74. After receipt of the event information, the report receiver 77 can send the report to the synchronization detector 79. The synchronization detector 79 can confirm that the same gesture was recorded by the user device 2 and the target device 4. The synchronization detector 79 can also compare the timestamp of the "double tap" gesture and the location of the "double tap" gesture on the target device 4 according to event information received from each of the user device 2 and target device 4. Using these values, the synchronization detector 79, in step S5, can determine whether the event information recorded by the user device 2 matches the event information recorded by the target device 4 for values of the timestamp and the location of the "double tap" event. If the event is not synchronized between the user device 2 and the target device 4 ("NO") in step S5, the process terminates and the process returns to steps S1 and S1' to await the occurrence of the next event. If the event is synchronized between the user device 2 and the target device 4 ("YES") in step S5, the process can proceed to step S6.

In step S6, the cloud processor can access the transmitter 81 to generate the command to be sent to the target device 4 and/or the user device 2. In the exemplary embodiment, the transmitter 81 can access the gesture repository of the cloud memory 78 to generate parameters of the command. As mentioned above, the command can identify the user device 2, define access privileges, acquire the task, e.g., initiate data synchronization and/or data sharing between the user device 2 and the target device 4. After the command is generated, the transmitter 81 and the target processor 76 initiate sharing of the command between the user device 2 and the target device 4 by sending the command to the data regulator 82. The data regulator 82 can send the command to the cloud communicator 74. The sending executor 84 of the cloud communicator 74 can send the command to the transfer mediator 86 for sending to the target device 4 and/or user device 2 for data synchronization. The process on the cloud infrastructure can then proceed to step S7, where the process can be ended.

Data sent by the transfer mediator 86 can be received by the command buffers 28, 58. The command buffers 28, 58 can initiate performance of the task, e.g., data synchronization and data sharing between the user device 2 and the target device 4 based on the content of the command. After receipt, the command buffers 28, 58 can prompt the target processor 46 and the user processor 16 to access the target memory 48 and the user memory 18, respectively. The processors can interpret the command and load the access privileges of the user device and initiate interaction between the user device 2 and the target device 4. In response, files, documents, and other data can begin data synchronization and/or data sharing between the user device 2 and the target device 4. It will be appreciated that data can travel from the user device 2 to the target device 4, as well as from the target device 4 to the user device 2.

After the command buffers 28, 58 initiate interaction between the user and the system, the target processor 46 and the user processor 16 can send an update of task performance, e.g., that the file was saved to the cloud infrastructure 6 to maintain data synchronization across the system 100. In the illustrated embodiment, the command buffers 28, 58 can send a signal to the sending executors 24, 54 to send an update to the cloud infrastructure 6 via the transfer mediators 26, 56 that the file has been copied. The report receiver 77 can then update the information throughout the cloud infrastructure 6. The target processor 46 and user processor 16 can then await the occurrence of the next event, e.g., an event that would trigger a "copy" command in the system 100. After the update of the task performance has been sent, the user components 12 and the target components 42 can revert to awaiting for the occurrence of the next event, e.g., real-time event detection.

In some embodiments, the target processor 46 can include a synchronization detector (not shown). The synchronization detector can evaluate reports and/or events to determine whether data collected from multiple sources has the same event data. For example, the synchronization detector can compare event data between a target device 4 and a user device 2 to determine whether the events are distinguishable. In some embodiments, the synchronization detector can normalize the data to determine whether two or more events are distinguishable.

Figure 9A:
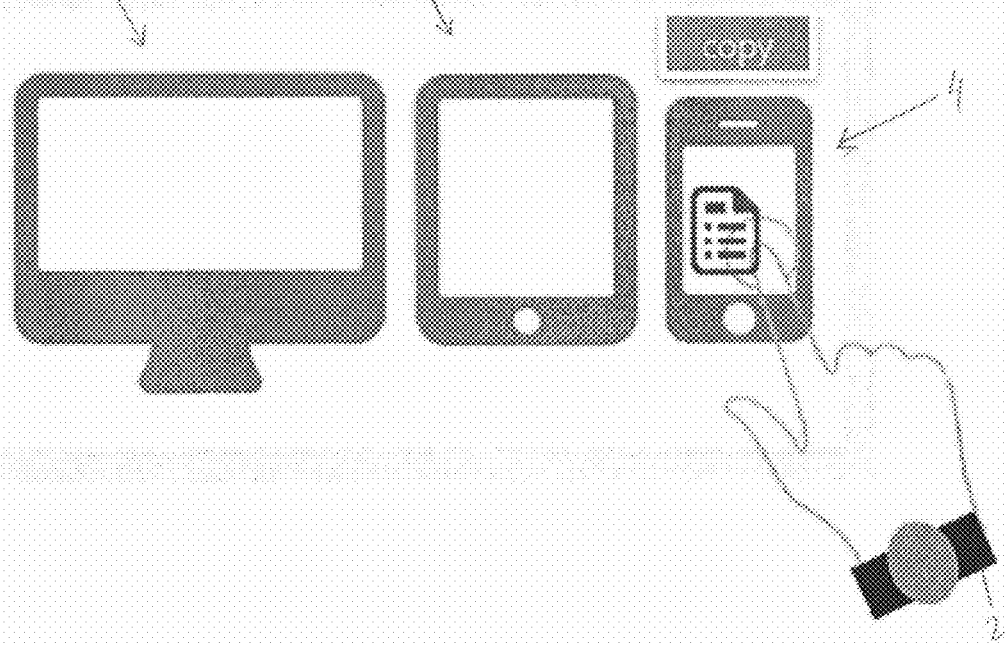
FIG. 9A is a pictorial representation of an embodiment of the system in which the user device mediates data sharing between target devices by selecting a source device from which to copy a file.
Figure 9B:
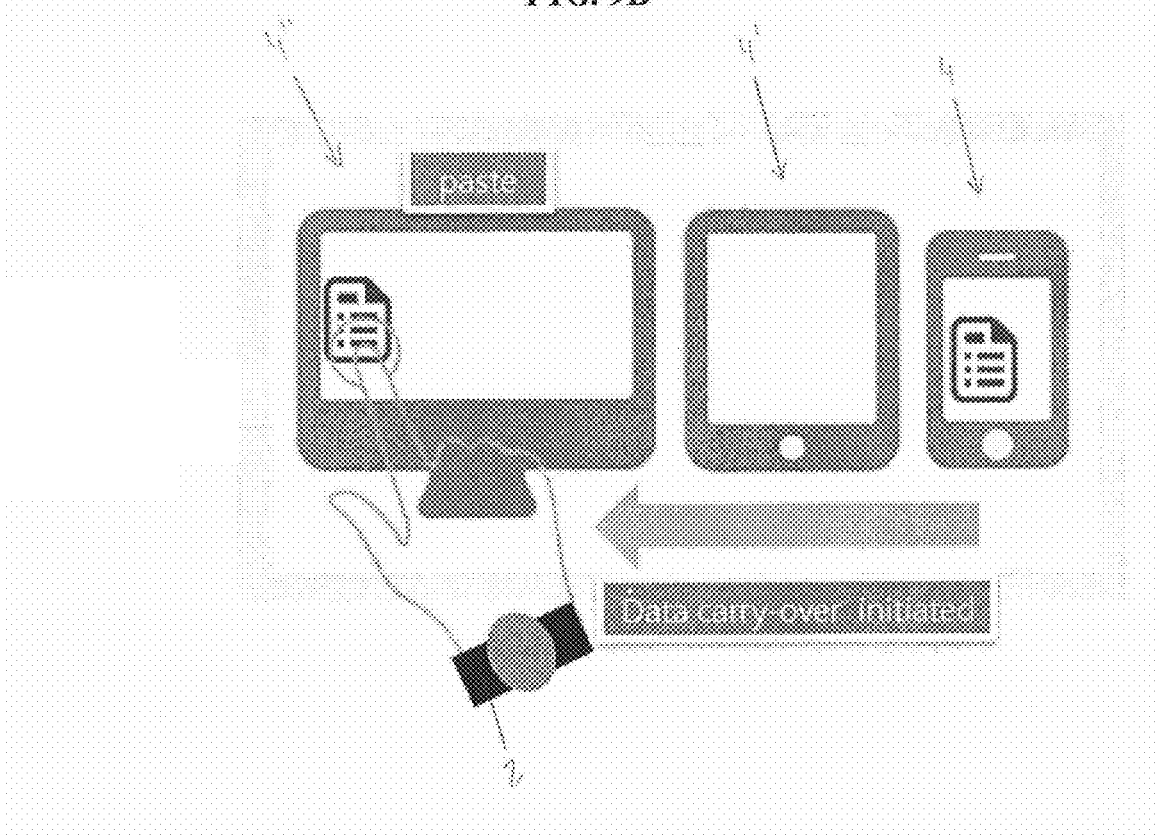
FIG. 9B is a pictorial representation of an embodiment of the system in which the user device mediates data sharing between target devices by selecting a receiver device to receive the file.
Figure 9C:
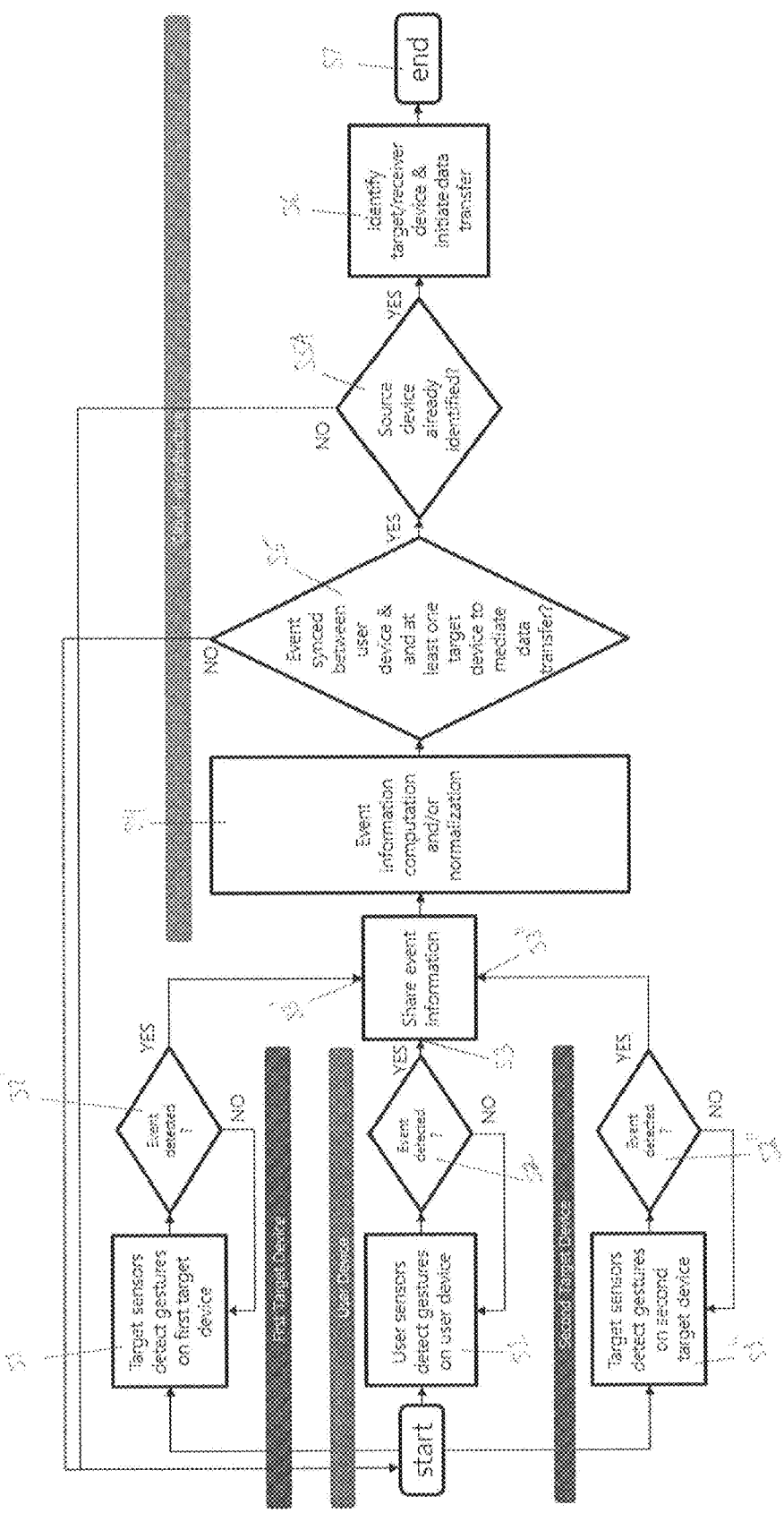
FIG. 9C is a simplified flow diagram of the procedures that may be used by embodiments described herein for the user device mediating data sharing between target devices.

FIGS. 9A-9C illustrates the user device acting as a mediator for data sharing between a first target device 4 and a second target device 4". It will be appreciated that the architecture of the second target device 4" can resemble that of the first target device 4. One having ordinary skill in the art will appreciate that the user device can be configured to be used as a mediator between more than two devices, more than three devices, more than five devices, and more than ten devices. The exemplary processes described below will be discussed with regards to a "triple tap" gesture at a time ti on a touchscreen of the first target device 4. In the illustrated embodiment of FIG. 9A, one having ordinary skill in the art can appreciate that the "triple tap" gesture can trigger an event that can generate a command to copy a file from the first target device. As discussed above, a subsequent triple tap gesture on the same target device 4, or on a the second target device 4", can select the second target device as the receiver device. Further, the "triple tap" gesture can also initiate an event that can generate a command to paste the file, as shown in FIG. 9B. It will be appreciated that, in some embodiments, the "triple tap" gesture can trigger an event that can generate a different command, e.g., synchronize data between the user device and the target devices, move a file, and/or delete a file, and so forth.

The simplified flow diagram of the embodiment of FIG. 9A is illustrated in FIGS. 9B and 9C. As shown, in addition to steps S1 and S1', which are described above with regards to FIG. 6B, the process of FIG. 9C can include step S1" in which the target sensors 52 can sense the "triple tap" gesture of the user device 2 on a second target device 4. After the gesture is sensed, the process flow can proceed to step S2" where a target processor 46" can analyze the gesture to determine if it detects that the gesture corresponds to an event. The target processor 46" can include a direct connection to each respective sensor, or the target processor 46" can detect a signal transmitted from target sensors 52" via a target communicator 44". In some embodiments, as shown in FIG. 7, an event detector 60" can analyze gestures received by the target processor 46". The event detector 60" can be configured to analyze the gesture to detect events. To analyze the gesture, the event detector 60" can access the target memory 48" to determine if the gesture is associated with an event. In some embodiments, the event detector 60" can read the gesture repository to find the event that is most closely associated with the gesture. Event information such as the event type, location on the target device, and/or timestamp of the event can be recorded. In some embodiments, the event detector 60" can use the event information to create a metadata file to track the source of the event information that corresponds to the event. After the event information is collected, the event information can be sent to a report regulator 62" to generate a report that records the event information. After the report is generated, the report regulator 62" can send the report and/or the event information to the target communicator 44". The event information can be sent by a sending executor 54" to a transfer mediator 56" for sending to other system modules.

If there is no event detected, the target processor 46" does not share event data with system modules and the process flow returns to step S1" where target sensors 52" can revert to awaiting occurrence of the next event. If the target processor 46" detects that the gesture corresponds to an event, the process flow can proceed to step S3". In step S3", event information can be sent to the target communicator 44" to be shared with other system modules. In the illustrated embodiment, the target communicator 44" can send the event information to the cloud communicator for computation by the cloud infrastructure.

FIG. 8 illustrates the processes performed by the cloud infrastructure 6 to determine if the event information is synchronized between the user device 2 and the target devices 4, 4". Event information sent by the transfer mediators 26, 56, 56" can be received by the cloud infrastructure 6 in step S4 for comparison and normalization. As shown in FIG. 8, the report receiver can receive event information sent by the transfer mediators 26, 56, 56" using the cloud processor 74. After receipt of the event information, the report receiver 77 can send the report to the synchronization detector 79. The synchronization detector 79 can confirm that the same gesture was recorded by the user device 2 and the target devices 4, 4". The synchronization detector 79 can also compare the timestamp of the "triple tap" gesture and the location of the "triple tap" gesture on the target devices 4, 4" according to event information received from each of the user device 2 and target devices 4, 4". Using these values, the synchronization detector 79, in step S5, can determine whether the event information recorded by the user device 2 matches the event information recorded by at least one of the target devices 4, 4" for values of the timestamp and the location of the "triple tap" event. If the event is not synchronized between the user device 2 and at least one of the target devices 4, 4" ("NO") in step S5, the process terminates and the process returns to steps S1, S1', and S1" to await the occurrence of the next event. If the event is synchronized between the user device 2 and at least one of the target devices 4, 4" ("YES") in step S5, the process can proceed to step S5A.

In step S5A, the cloud processor 76 can access the transmitter 81 to determine if the source device was already identified. The flag parameter of the transmitter 81 can access the cloud memory 78 to check whether at least one of the target devices 4, 4" is aware that the user device 2 has been identified as the source device. If the source device has not been identified ("NO"), the process terminates and the process returns to steps S1, S1', and S1" to await the occurrence of the next event. If the source device has been identified ("YES"), the process can proceed to step S6.

In step S6, the cloud processor 76 can access the transmitter 81 to generate the command to be sent to the target device 4 and/or the user device 2. In the exemplary embodiment, the transmitter 81 can access the gesture repository of the cloud memory 78 to generate parameters of the command. As mentioned above, the command can identify the user device 2, define access privileges, acquire the task, e.g., synchronize data between the user device 2 and the target devices 4, 4", and/or initiate data synchronization and data sharing. After the command is generated, the transmitter 81 and the target processor 76 initiate sharing of the command between the user device 2 and the target devices 4, 4" by sending the command to the data regulator 82. The data regulator 82 can send the command to the cloud communicator 74. The sending executor 84 of the cloud communicator 74 can send the command to the transfer mediator 86 for sending to the target devices 4, 4" and/or user device 2 for data synchronization. The process on the cloud infrastructure 6 can then proceed to step S7, where the process can be ended.

Data sent by the transfer mediator 86 can be received by command buffers 28, 58, 58". The command buffers 28, 58, 58" can initiate performance of the task, e.g., data synchronization and data sharing between the user device 2 and the target devices 4, 4" based on the content of the command. After receipt, the command buffers 28, 58, 58" can prompt the target processors 46, 46" and the user processor 16 to access display memories 48, 48" and the user memory 18, respectively. The processors can interpret the command and load the access privileges of the user device 2 and initiate interaction between the user device 2 and the target devices 4, 4". In response, files, documents, and other data can be copied from the first target device 4 and pasted to the second target device 4". It will be appreciated that data can travel over the network 8 from the first target device 4 to the second target device 4", as well as from the second target device 4" to the first target device 4.

After the command buffers 28, 58, 58" initiate interaction, the target processors 48, 48" and the user processor 16 can send an update of task performance, e.g., that the file was saved, to the cloud infrastructure 6 to maintain data synchronization across the system 100. In the illustrated embodiment, the command buffers 28, 58, 58" can send a signal to the sending executors 24, 54, 54" to send an update to the cloud infrastructure 6 via the transfer mediators 26, 56, 56" that the file has been copied. The report receiver 77 can then update the information throughout the cloud infrastructure 6. The target processors 48, 48" and user processor 16 can then await the occurrence of the next event, e.g., an event that can trigger data synchronization between the user device and at least one or more target devices. After the update of the task performance has been sent, the user components 12 and the target components 42 can revert to awaiting for the occurrence of the next event, e.g., real-time event detection. In some embodiments, the cloud infrastructure 6 can store a manifest of the process that can be referenced at a later time.

In some embodiments, data synchronization and/or data sharing between the user device 2 and the target device 4 can be implemented without using the cloud infrastructure 6. After event synchronization is detected by the user processor 16 and the target processor 46, peer-to-peer (P2P) data sharing can occur between the user device and the target device. The target device 4 can be configured to perform computations on event information from system modules. For example, event information from the user device 2 and the target device 4 can be computed by the target processor 46. The target processor 46 can normalize event data received from the user device(s), target device(s) and other system modules by extracting event type, timestamp, and/or location data from the event information. The target processor 46 can then analyze the data to determine if synchronized match exists between two or more modules, e.g., if the event information, such as event type and timestamp, communicated by the user device 2 is the same as the event data communicated by the target device 4. In some embodiments, computation of the event information gathered from the target device 4 and the user device 2 can be performed by the user device 4.

While the invention has been particularly shown and described with reference to specific illustrative embodiments, it should be understood that various changes in form and detail may be made without departing from the spirit and scope of the invention.

What is claimed is:

1. A method, comprising:
   detecting an occurrence of a first event using a user device, the user device being configured to collect a first event information, the first event information having a first value;
   detecting an occurrence of a second event on a target device, the target device being configured to collect a second event information, the second event information having a second value;
   comparing the first value to the second value;
   generating a command to perform a task if the first value is substantially similar to the second value, the task comprising synchronizing data between the user device and the target device such that a data from the user device is shared with the target device or a data from the target device is shared with the user device; and
   performing the task,
   wherein the first value comprises a first timestamp and the second value comprises a second timestamp, the first and second timestamps occurring within a time window such that the first value and the second value are temporally matched.

2. The method of claim 1, wherein the first event and the second event are detected by a sensor, the sensor sensing a gesture performed relative to the target device by the user device.

3. The method of claim 2, wherein the gesture is performed on a touchscreen of the target device.

4. The method of claim 2, wherein the sensor comprises at least one of a motion sensor, an optical-visual sensor, or a touch sensor.

5. The method of claim 2, wherein the gesture specifies the target device for performing data synchronization between the user device and the target device.

6. The method of claim 1, wherein the data further comprises at least one of a document, a file, or a graphic.

7. The method of claim 1, wherein the first value further comprises at least one of an event type, and a location of the event relative to the target device; and
   wherein the second value further comprises at least one of an event type, a timestamp, and a location of the event relative to the target device.

8. The method of claim 1, wherein the user device is a smart device.

9. The method of claim 1, wherein analyzing the first and second event information is performed by a cloud infrastructure.

10. The method of claim 1,
    wherein the user device further comprises a user memory that stores the task that corresponds to the command; and
    wherein the target device further comprises a target memory that stores the task that corresponds to the command.

11. A method, comprising:
    detecting occurrence of a first event using a user device, the user device being configured to collect a first event information, the first event information having a first value;
    detecting occurrence of a second event on a first target device, the first target device being configured to collect a second event information, the second event information having a second value;
    detecting occurrence of a third event on a second target device, the second target device being configured to collect a third event information, the third event information having a third value;
    determining whether the first value is substantially similar to at least one of the second value and the third value;
    generating a command to perform a task if the first value is substantially similar to at least one of the second value and the third value, the task comprising sharing data from the first target device to the second target device; and
    performing the task,
    wherein the first value comprises a first timestamp, the second value comprises a second timestamp, and the third value comprises a third timestamp, the first timestamp and at least one of the second timestamp and the third timestamp occurring within a time window such that the first value and at least one of the second value and the third value are temporally matched.

12. The method of claim 11, wherein the first, second, and third events are detected by a sensor, the sensor sensing a first gesture performed relative to the at least one of the first target device and the second target device by the user device.

13. The method of claim 12, wherein sharing data further comprises copying a data from the first target device and saving the data to the second target device.

14. The method of claim 13, wherein the data is stored on the user device after copying.

15. The method of claim 12, further comprising performing a second gesture relative to the at least one of the first target device and the second target device by the user device.

16. The method of claim 15, wherein the first gesture is the same as the second gesture.

17. The method of claim 11, wherein the data further comprises at least one of a document, a file, or a graphic.

18. The method of claim 11, wherein the first event and the second event are detected by a sensor, the sensor sensing a gesture performed relative to the target device by the user device.

19. The method of claim 18, wherein the gesture specifies the target device for synchronizing data between the user device and the target device.

20. The method of claim 18, wherein the sensor comprises at least one of a motion sensor, an optical-visual sensor, or a touch sensor.

21. The method of claim 11, wherein the first value further comprises at least one of an event type, and a location of the event relative to the target device;
    wherein the second value further comprises at least of an event type, and a location of the event relative to the target device; and wherein the third value further comprises at least of an event type, and a location of the event relative to the target device.

22. The method of claim 11, wherein the user device is a smart device.

* * * * *